(12) United States Patent
Kwon et al.

(10) Patent No.: US 11,893,399 B2
(45) Date of Patent: Feb. 6, 2024

(54) ELECTRONIC DEVICE FOR EXECUTING ROUTINE BASED ON CONTENT AND OPERATING METHOD OF THE ELECTRONIC DEVICE

(71) Applicant: Samsung Electronics Co., Ltd., Suwon-si (KR)

(72) Inventors: Hobum Kwon, Suwon-si (KR); Hakkyu Kim, Suwon-si (KR); Rojin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 17/698,489

(22) Filed: Mar. 18, 2022

(65) Prior Publication Data

US 2022/0300300 A1 Sep. 22, 2022

Related U.S. Application Data

(63) Continuation of application No. PCT/KR2022/003716, filed on Mar. 17, 2022.

(30) Foreign Application Priority Data

Mar. 22, 2021 (KR) .................. 10-2021-0036757

(51) Int. Cl.
*G06F 9/451* (2018.01)
*G06F 11/34* (2006.01)
(Continued)

(52) U.S. Cl.
CPC ............... *G06F 9/451* (2018.02); *G06F 9/54* (2013.01); *G06F 11/3438* (2013.01); *G06Q 30/0241* (2013.01); *G06Q 50/01* (2013.01)

(58) Field of Classification Search
CPC ........ G06F 9/451; G06F 9/54; G06F 11/3438; G06Q 30/0241; G06Q 50/01
See application file for complete search history.

(56) References Cited

U.S. PATENT DOCUMENTS 8,990,688 B2   3/2015   Lee et al.
11,070,949 B2  7/2021   Gross et al.
(Continued)

FOREIGN PATENT DOCUMENTS

EP    1 528 464 A2    5/2005
JP   2019-057290 A    4/2019
(Continued)

OTHER PUBLICATIONS

International Search Report with Written Opinion and English Translation dated Jun. 20, 2022; International Appln. No. PCT/KR2022/003716.

*Primary Examiner* — Quoc A Tran
(74) *Attorney, Agent, or Firm* — Jefferson IP Law, LLP

(57) ABSTRACT

An operating method of an electronic device is provided. The operating method includes executing a first application in the electronic device, identifying a first content and at least one user interface (UI) component that are displayed on a first execution screen of the first application, obtaining first state information of the first execution screen based on a result of the identifying of the first content and the at least one UI component, obtaining a routine for performing a first task corresponding to the first state information based on usage pattern information of applications for a user of the electronic device and the first state information, and executing the routine.

20 Claims, 18 Drawing Sheets

(51) Int. Cl.
    *G06F 9/54*          (2006.01)
    *G06Q 30/0241*    (2023.01)
    *G06Q 50/00*      (2012.01)

(56) References Cited

U.S. PATENT DOCUMENTS

| | | |
|---|---|---|
| 2005/0054381 A1 | 3/2005 | Lee et al. |
| 2016/0085812 A1 | 3/2016 | Park et al. |
| 2018/0357707 A1 | 12/2018 | Lee |
| 2019/0138741 A1* | 5/2019 | Lee ................ G06F 21/604 |
| 2019/0141494 A1* | 5/2019 | Gross ............... G06F 3/016 |
| 2019/0197227 A1 | 6/2019 | Kang et al. |
| 2020/0382568 A1* | 12/2020 | Krochmal ........... H04L 67/104 |
| 2021/0042662 A1* | 2/2021 | Pu ..................... G06N 20/00 |
| 2021/0306812 A1 | 9/2021 | Gross et al. |
| 2022/0028387 A1 | 1/2022 | Walker, II et al. |
| 2022/0382788 A1 | 12/2022 | Lee et al. |
| 2022/0400365 A1* | 12/2022 | Bains ..................... H04W 4/80 |

FOREIGN PATENT DOCUMENTS

| | | |
|---|---|---|
| JP | 2021-064393 A | 4/2021 |
| KR | 10-2005-0025220 A | 3/2005 |
| KR | 10-0680190 B1 | 2/2007 |
| KR | 10-0680191 B1 | 2/2007 |
| KR | 10-2014-0119617 A | 10/2014 |
| KR | 10-1599892 B1 | 3/2016 |
| KR | 10-2018-0135221 A | 12/2018 |
| KR | 10-1927706 B1 | 12/2018 |
| KR | 10-2020-0040927 A | 4/2020 |
| KR | 10-2021-0101583 A | 8/2021 |
| KR | 10-2021-0133312 A | 11/2021 |
| KR | 10-2321983 B1 | 11/2021 |

\* cited by examiner

ELECTRONIC DEVICE FOR EXECUTING ROUTINE BASED ON CONTENT AND OPERATING METHOD OF THE ELECTRONIC DEVICE

CROSS-REFERENCE TO RELATED APPLICATION(S)

This application is a continuation application, claiming priority under § 365(c), of an International application No. PCT/KR2022/003716, filed on Mar. 17, 2022, which was based on and claimed the benefit of a Korean patent application number 10-2021-0036757, filed on Mar. 22, 2021, in the Korean Intellectual Property Office, the disclosure of which is incorporated by reference herein in its entirety.

TECHNICAL FIELD

The disclosure relates to an electronic device and an operating method of the electronic device. More particularly, the disclosure relates to an electronic device capable of executing a routine based on content provided by the electronic device, and an operating method of the electronic device.

BACKGROUND ART

Recently, as services for content increase, users may access various contents through electronic devices. In addition, as the usability of electronic devices is advancing, the configuration of a user interface provided to a user along with the content has also diversified.

Accordingly, there is a need for a technology capable of identifying information on a content provided by an electronic device and efficiently using a user interface configuration according to a user's intention for the content.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an electronic device that recognize a content provided by the electronic device and a user's intention for the content, and execute a routine in which the user's intention is reflected, and an operating method of the electronic device.

Another aspect of the disclosure is to provide an electronic device that may generate a routine for the operation of an application that the user frequency uses and an operating method of the electronic device.

Another aspect of the disclosure is to provide an electronic device may obtain state information of a screen of an electronic device and to execute or recommend a routine corresponding to the state information and an operating method of the electronic device.

Additional aspects will be set forth in part in the description which follows and, in part, will be apparent from the description, or may be learned by practice of the presented embodiments.

Technical Solution to Problem

In accordance with an aspect of the disclosure, an operating method of an electronic device is provided. The operating method includes executing a first application in the electronic device, identifying a first content and at least one user interface (UI) component that are displayed on a first execution screen of the first application, obtaining first state information of the first execution screen based on a result of the identifying of the first content and the at least one UI component, obtaining a routine for performing a first task corresponding to the first state information based on usage pattern information of applications for a user of the electronic device and the first state information, and executing the routine.

In accordance with another aspect of the disclosure, an electronic device is provided. The electronic device includes a communication interface configured to communicate with an external device, a user input device, a display, a processor configured to control an operation of the electronic device, and a memory storing at least one instruction, wherein the processor is further configured to execute the at least one instruction to execute a first application in the electronic device, to identify a first content and at least one UI component that are displayed on a first execution screen of the first application, to obtain first state information of the first execution screen based on a result of the identifying of the first content and the at least one UI component, to obtain a routine for performing a first task corresponding to the first state information based on usage pattern information of applications for a user of the electronic device and the first state information, and to execute the routine.

In accordance with another aspect of the disclosure, a non-transitory computer-readable recording medium is provided. The non-transitory computer-readable recording medium may have recorded thereon at least one instruction, which when executed by a processor of an electronic device, causes the processor to execute a first application in the electronic device, identify a first content and at least one UI component that are displayed on a first execution screen of the first application, obtain first state information of the first execution screen based on a result of the identifying of the first content and the at least one UI component, obtain a routine for performing a first task corresponding to the first state information based on usage pattern information of applications for a user of the electronic device and the first state information, and execute the routine.

Advantageous Effects of Disclosure

The electronic device may recognize content provided by the electronic device and the user's intention for the content, and execute a routine in which the user's intention is reflected.

Routines for the actions of applications that the user frequently uses may be generated.

State information of a screen of the electronic device may be obtained, and a routine corresponding to the state information may be executed or recommended.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE OF DISCLOSURE

Figure 1:
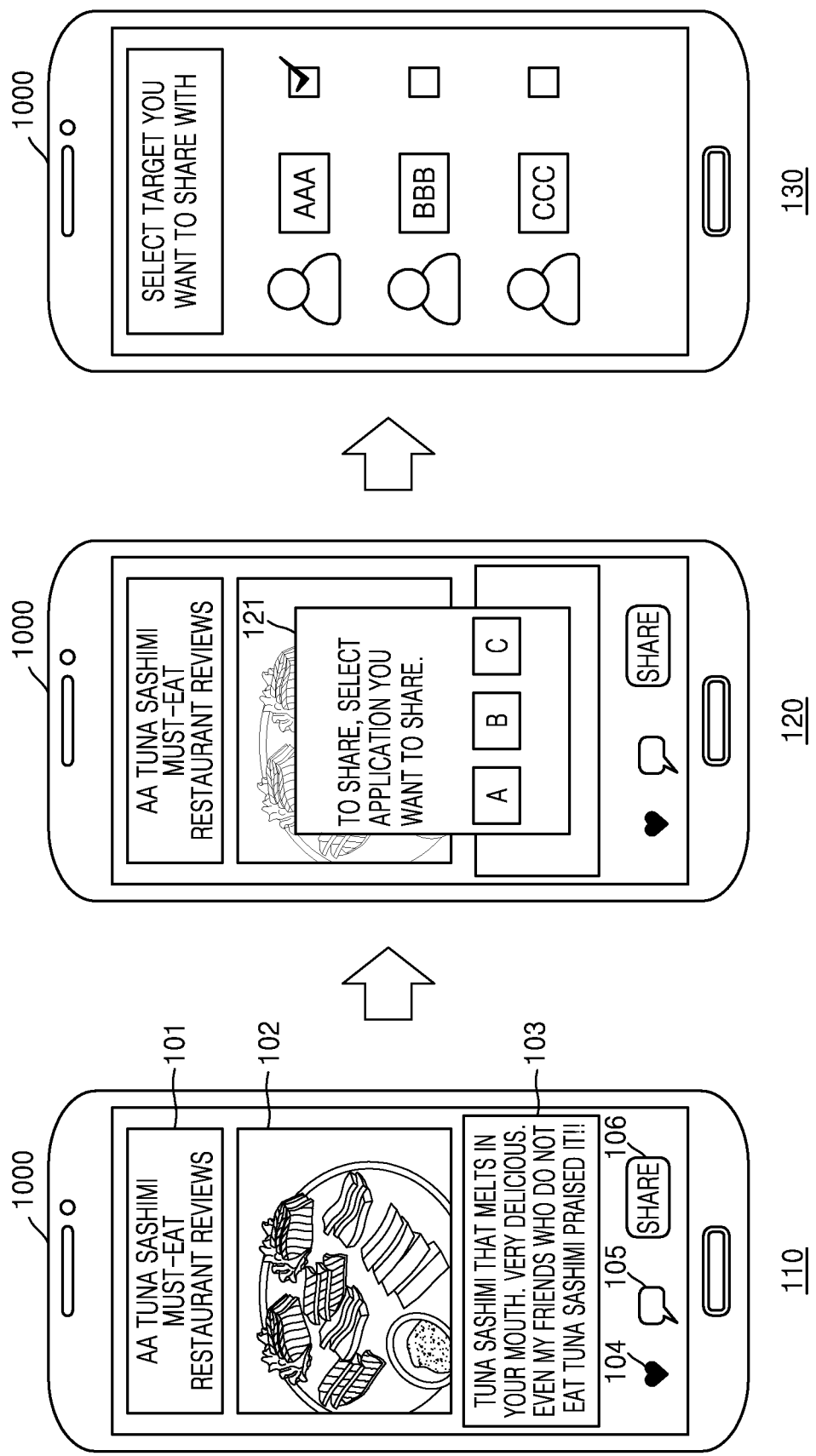
FIG. 1 is a conceptual diagram illustrating an operation of an electronic device for obtaining state information based on a result of identifying content and user interface (UI) components displayed on a screen of the electronic device, and executing a routine corresponding to the state information, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings so that those of ordinary skill in the art to which the disclosure pertains may easily implement them. However, the disclosure may be implemented in several different forms and is not limited to the embodiments described herein. In addition, in order to clearly explain the disclosure in the drawings, parts irrelevant to the description are omitted, and similar reference numerals are attached to similar parts throughout the disclosure.

Throughout the disclosure, when a part is "connected" with another part, this includes not only the case of being "directly connected" but also the case of being "electrically connected" with another element interposed therebetween. In addition, when a part "comprises" or "includes" a certain component, it means that other components may be further included, rather than excluding other components, unless otherwise stated.

Terms such as first, second, etc. may be used to describe various elements, but the elements should not be limited by the terms. The above terms are used only for the purpose of distinguishing one component from another component. For example, without departing from the scope of the disclosure, a first component may be referred to as a second component, and similarly, a second component may also be referred to as a first component. The expression "and/or" includes a combination of a plurality of related listed items or any of a plurality of related listed items.

In the disclosure, the electronic device may include mobile phones, smartphones, smart pads, laptop computers, tablet personal computers (PCs), electronic-book terminals, electronic devices for digital broadcasting, personal digital assistants (PDAs), portable multimedia players (PMI's), navigations, and MP3 players, but is not limited thereto.

In the disclosure, a user interface (UI) component includes a component included in a UI provided by an electronic device, and may refer to a component that interacts between a user and the electronic device within the electronic device. For example, the UI component may include a component included in a graphical user interface (GUI) used for a user to input or select information on an execution screen of an application, a hardware button of an electronic device, and the like.

In the disclosure, the state information may include information indicating that an event may occur through a screen of the electronic device based on a result of identifying content and UI components provided on the screen of the electronic device. For example, the content and the UI components provided on the screen of the electronic device may be provided on an execution screen of an application. For example, the event may include an operation executed in the application according to user input information received through the UI component. For example, the event may include an event generated by the execution of a function or menu frequently used by a user in the application. For example, the state information may include information indicating that an event corresponding to usage pattern information of the application for the user may occur.

For example, the state information may include information indicating a content provided by the electronic device and a situation before and after a reaction by the user to the content. In addition, the state information may include information indicating a relationship between a content provided by the electronic device and a subsequent operation of the electronic device after the content is provided. In this case, the subsequent operation of the electronic device may include an operation of receiving user input information through a UI component in the electronic device, and an operation of executing a function or menu of an application according to the user input information. In addition, the state information may include information indicating a situation or relationship between a content provided on the execution screen of the application and a UI component related to the user input information. In addition, the state information may be determined based on an attribute of a UI component that receives user input information according to the content provided on the execution screen of the application. In addition, the state information may include state tag information including words, keywords, phrases, sentences, etc. indicating the state information. In addition, the state information may include state information of a condition event that satisfies an execution condition of a routine, and state information of a result event indicating an execution result of the routine.

In the disclosure, the routine may include an operation or a set of a series of operations of an electronic device to perform a task, and may be specified by a function of an application and functions of the electronic device. In addition, the routine may be set based on usage pattern information indicating a usage pattern in which a user uses an application in the electronic device. For example, information of at least one of an application frequently used by a user, a function frequently used by the user in the application, or a function frequently used by the user in conjunction with the applications may be stored as usage pattern information. For example, when a frequency of use of an item exceeds a preset threshold value for a preset time, it may be determined that the item is frequently used. When a routine is generated and an event corresponding to a condition event that satisfies an execution condition of the routine is detected in the electronic device, the electronic device may execute an event corresponding to the result event.

In the disclosure, a task may represent a mission to achieve a certain objective, depending on the execution of a routine. In different applications, routines for a task may be different. In other words, in order to perform a task in different applications, detailed operations executed in each application, an order of detailed operations, etc. may be different.

Hereinafter, the disclosure will be described in detail with reference to the accompanying drawings.

FIG. 1 is a conceptual diagram illustrating an operation of an electronic device 1000 of obtaining state information based on a result of identifying content and user interface (UI) components displayed on a screen of the electronic device 1000, and executing a routine corresponding to the state information, according to an embodiment of the disclosure.

Referring to a part 110 of FIG. 1, an AAA application may be executed in the electronic device 1000. The electronic device 1000 may display information about a review of an AA must-eat tuna sashimi restaurant through an execution screen of the AAA application. The electronic device 1000 may identify a content and at least one UI component, displayed on the execution screen of the AAA application. For example, the content may indicate information about the review for the AA must-eat tuna sashimi restaurant. For example, the content may be texts 101 and 103 and an image 102 for the AA must-eat tuna sashimi must-eat restaurant reviews. In addition, for example, the at least one UI component may include a GUI used for a user to input or select information on the execution screen of the AAA application. For example, the at least one UI component may include a "Like" icon 104, a "Write Review" icon 105, and a "Share" icon 106.

The electronic device 1000 may obtain state information of the execution screen of the AAA application based on a result of identifying the content and at least one UI component displayed on the execution screen of the AAA application. For example, the state information may include information indicating a state in which the "Like" icon 104 may be pressed, a review may be written, or the review may be shared with other users, for the must-eat tuna sashimi must-eat restaurant review.

The electronic device 1000 may obtain a routine corresponding to state information based on application usage pattern information of the user and the state information of the execution screen of the AAA application. For example, in a BBB application that provides the same service as the AAA application, a use action of the user to share a must-eat restaurant review may be stored as a usage pattern. In addition, the BBB application may have a share routine set for must-eat restaurant reviews. The electronic device 1000 may generate a share routine for a must-eat restaurant review in the AAA application based on the routine of the BBB application and state information of the execution screen of the AAA application.

Referring to a part 120 of FIG. 1, the electronic device 1000 may execute the generated must-eat restaurant review share routine. The electronic device 1000 may display information 121 of applications that may be shared.

Referring to a part 130 in FIG. 1, the electronic device 1000 may execute an application selected based on the information 121 of applications that may be shared and display a screen for selecting a target to be shared.

Figure 2:
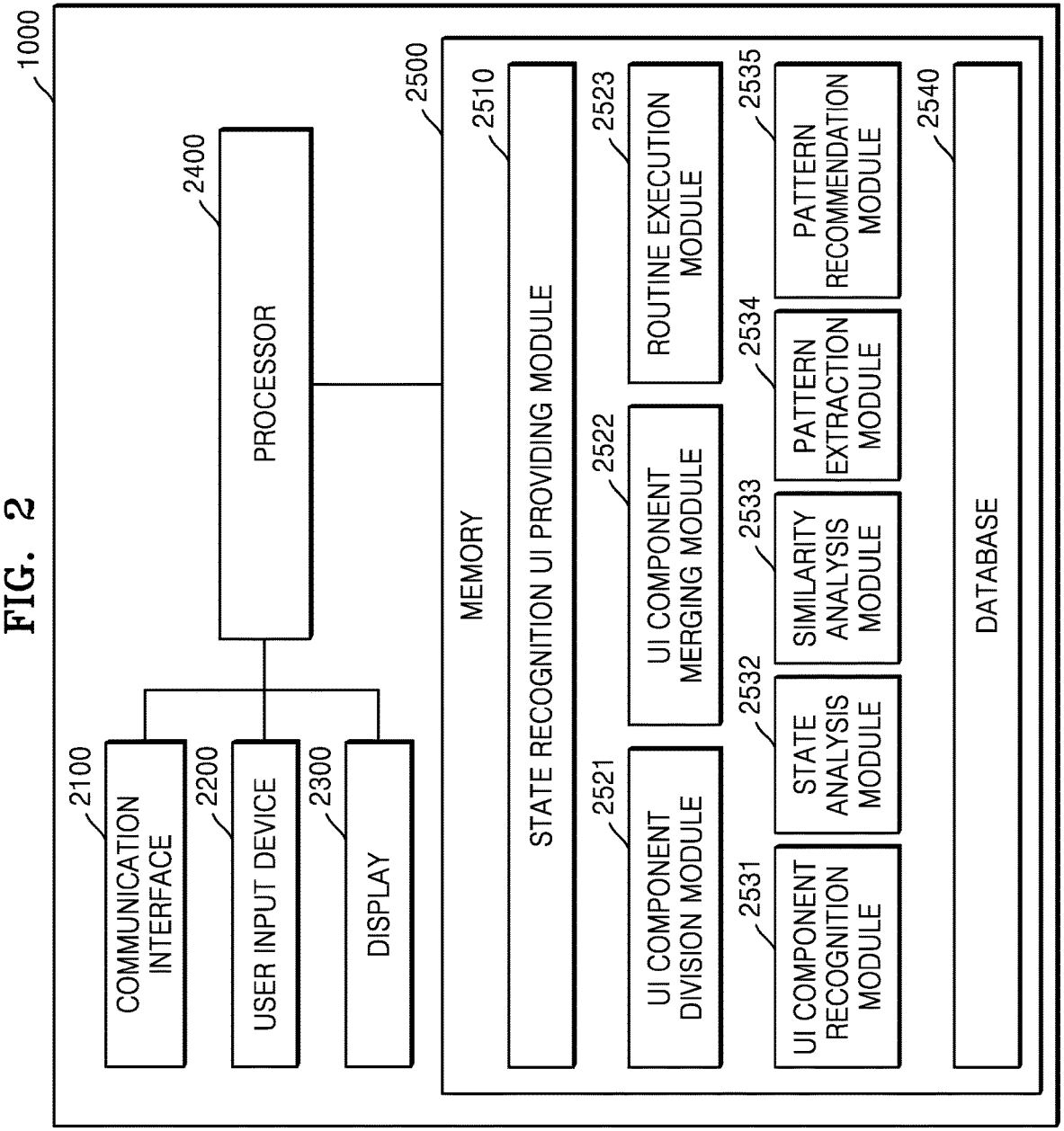
FIG. 2 is a block diagram of a configuration of an electronic device according to an embodiment of the disclosure.

FIG. 2 is a block diagram of a configuration of an electronic device 1000 according to an embodiment of the disclosure.

Referring to FIG. 2, the electronic device 1000 according to an embodiment of the disclosure may include a communication interface 2100, a user input device 2200, a display 2300, a processor 2400, and a memory 2500.

The communication interface 2100 may include one or more components for performing communication with an external device and a server. For example, the communication interface 2100 may include a short-range wireless communication unit, a mobile communication unit, and a broadcast receiving unit. The short-range wireless communication unit may include a Bluetooth communication unit, a Bluetooth Low Energy (BLE) communication unit, a Near Field Communication unit, a wireless local area network (WLAN) communication unit (Wi-Fi), a Zigbee communication unit, an Infrared Data Association (IrDA) communication unit, a Wi-Fi Direct (WFD) communication unit, an ultra wideband (UWB) communication unit, and Ant+ communication unit, but is not limited thereto. The mobile communication unit transmits/receives a radio signal to and from at least one of a base station, an external terminal, or a server on a mobile communication network. In this case, the radio signal may include various types of data according to transmission/reception of a voice call signal, a video call signal, or a text/multimedia message. The broadcast receiving unit receives a broadcast signal and/or broadcast-related information from the outside through a broadcast channel. The broadcast channel may include a satellite channel and a terrestrial channel.

The user input device 2200 refers to a means for a user to input data for controlling the electronic device 1000. For example, the user input device 2200 includes a key pad, a dome switch, a touch pad (contact capacitance method, pressure resistance film method, infrared sensing method, surface ultrasonic conduction method, integral tension measurement method, piezo effect method, etc.), a jog wheel, or a jog switch, but is not limited thereto.

The display 2300 may display information processed in the electronic device 1000. For example, the display 2300 may display an execution screen of an application executed in the electronic device 1000.

When the display 2300 and the touch pad form a layer structure to form a touch screen, the display 2300 may be used as an input device in addition to an output device. The display 2300 may include at least one of a liquid crystal display, a thin film transistor-liquid crystal display, an organic light-emitting diode, a flexible display, a three-dimensional (3D) display, or an electrophoretic display. According to an implementation form of the electronic device 1000, the electronic device 1000 may include two or more displays.

The memory 2500 may store a program to be executed by the processor 2400 and may store data input to or output from the electronic device 1000.

The memory 2500 may include a storage medium of at least one of a memory of a flash memory type, a hard disk type, a multimedia card micro type, and a card type (for example, Secure Digital (SD) memory or eXtreme Digital (XD) memory), a random access memory (RAM), a static RANI, a read-only memory (ROM), an electrically erasable programmable ROM (EEPROM), a programmable ROM (PROM), a magnetic memory, a magnetic disk, or an optical disk.

Programs stored in the memory 2500 may be classified into a plurality of modules according to functions thereof.

For example, the programs may include a state recognition UI providing module 2510, a UI component division module 2521, a UI component merging module 2522, a routine execution module 2523, a UI component recognition module 2531, a state analysis module 2532, a similarity analysis module 2533, a pattern extraction module 2534, and a pattern recommendation module 2535.

The processor 2400 may control overall operations of the electronic device 1000. For example, the processor 2400 may generally control the communication interface 2100, the user input device 2200, the display 2300, the memory 2500, and the like by executing the programs stored in the memory 2500.

For example, the processor 2400 may provide a UI used to interact between the user and the application on the execution screen of the application by executing the state recognition UI providing module 2510 stored in the memory 2500. For example, the UI component may refer to a component that interacts between the user and the electronic device 1000 within the electronic device 1000 so that the electronic device 1000 outputs information and receives input information from the user. For example, the execution screen of the application may include a UI component used for a user to input or select information. For example, the UI component may include a UI component for selecting information in an application, a UI component for inputting information, or the like.

The processor 2400 may collect user input information and application information by executing the UI component division module 2521 stored in the memory 2500. For example, the user input information may include information received through the user input device 2200, and specifically, may include text information input by the user on an execution screen of an application, a UI component selected by the user, and the like. For example, the application information may include information on at least one of a service provided by the application, a type of the application, an execution screen of the application displayed on the electronic device 1000, or a content provided on the execution screen of the application.

The processor 2400 may obtain the UI component and state information by using a service layer module by executing the UI component division module 2521 stored in the memory 2500, and store the UI component and the state information in the database 2540. In this case, the service layer module may include the UI component recognition module 2531, the state analysis module 2532, the similarity analysis module 2533, the pattern extraction module 2534, and the pattern recommendation module 2535. Operations of the service layer module are described below. For example, the UI component division module 2521 may extract a UI component used to receive the user input information or selection information from the execution screen of the application. The UI component division module 2521 may obtain state information based on the UI component and content provided on the execution screen of the application.

For example, the state information may include information indicating that an event may occur through a screen of the electronic device 1000 based on a result of identifying a content and UI components provided on the screen of the electronic device 1000. For example, the content and UI components provided on the screen of the electronic device 1000 may be provided on the execution screen of the application. For example, the event may mean an operation executed in the application according to user input information received through the UI component. For example, the event may include an event generated by an execution of a function or menu frequently used by a user in the application.

For example, the state information may include information indicating that an event corresponding to usage pattern information of the application for the user may occur.

In addition, the state information may include information indicating a content provided by the electronic device 1000 and a situation before and after a reaction by the user to the content. For example, the state information may include information indicating a relationship between a content provided by the electronic device and a subsequent operation of the electronic device after the content is provided. In this case, the subsequent operation of the electronic device may include an operation of receiving user input information through a UI component in the electronic device, or an operation of executing a function or menu of an application according to the user input information.

In addition, the state information may include information indicating a situation or relationship between a content provided on an execution screen of an application and a UI component related to the user input information. In addition, the state information may include state tag information including a word or keyword indicating the state information. In addition, the state information may include state information of a condition event that satisfies an execution condition of a routine, and state information of a result event indicating an execution result of the routine.

The processor 2400 may collect the user input information and the application information by executing the UI component merging module 2522 stored in the memory 2500, and may generate a routine based on the UI component and the state tag information by using the service layer module. For example, a routine may include an operation or a set of series of operations of the electronic device to perform a task. In addition, the routine may be specified by a function of the application or functions of the electronic device. In addition, the routine may be set based on the usage pattern information of the application for the user. At least one function frequently used by the user in an application may be set as a routine. The processor 2400 may store the generated routine in the database 2540 by executing the UI component merging module 2522.

By executing the routine execution module 2523 stored in the memory 2500, the processor 2400 may collect the user input information and the application information, and identify an executable routine and execute or recommend the routine by using the service layer module.

The service layer module may include the UI component recognition module 2531, the state analysis module 2532, the similarity analysis module 2533, the pattern extraction module 2534, and the pattern recommendation module 2535, but is not limited thereto. The UI component division module 2521, the UI component merging module 2522, and the routine execution module 2523 may independently perform an assigned function by using at least one module in the service layer module.

The processor 2400 may extract a selectable UI component from the execution screen of the application by executing the UI component recognition module 2531 stored in the memory 2500. For example, the UI component recognition module 2531 may receive the user input information from the execution screen of the application or extract the UI component that may receive the user-selection information. In addition, the processor 2400 may convert a voice signal obtained through a sound sensor such as a microphone in the electronic device 1000 into a voice command by executing the UI component recognition module 2531.

The processor 2400 may execute the state analysis module 2532 stored in the memory 2500 to thereby generate state tag information based on the execution screen of the application and the user information obtained from the electronic device 1000. For example, the user information may include user input information input through a screen of the electronic device 1000, user sensor information detected by a sensor of the electronic device 1000, and user voice information detected by the electronic device 1000. The state analysis module 2532 may analyze a relationship between a content provided by the electronic device 1000 and a subsequent operation of the electronic device 1000 after the content is provided, and generate state tag information including a word or keyword representing state information based on the analysis result.

The processor 2400 may determine the similarity between user input information by executing the similarity analysis module 2533 stored in the memory 2500.

The processor 2400 may, by executing the pattern extraction module 2534 stored in the memory 2500, extract at least one of frequently used functions, items, or menus as a usage pattern based on usage information such as functions, items, and menus used by the user in the application, and generate usage pattern information. For example, when an item is used more than a preset number of times for a preset time, it may be determined that a frequency of use of the item is high.

By executing the pattern recommendation module 2535 stored in the memory 2500, the processor 2400 may predict a usage pattern that the user will execute on the execution screen of the application and recommend the usage pattern.

The processor 2400 may store, in a database 2540 in the memory 2500, at least one content provided on the execution screen of the application, information on UI components related to the execution screen of the application, and information indicating a relationship between the content and the UI components.

Meanwhile, the processor 2400 may obtain state information based on a content provided by an application executed in the electronic device 1000 and user input information detected by an activity of the user, and execute a routine corresponding to the state information.

For example, the processor 2400 may monitor at least one event occurring in the electronic device 1000. For example, the event may include an operation of an application executed in the electronic device 1000 or a user operation detected by the electronic device 1000 in relation to the application executed in the electronic device 1000. The processor 2400 may monitor an event occurring in the electronic device 1000 based on information received through the user input device 2200 or information detected by a sensor in the electronic device 1000.

The processor 2400 may collect information of the application by monitoring the operation of the application executed in the electronic device 1000. The operation of the application may include at least one of an operation for executing the application, an operation of providing the execution screen of the application, or an operation for terminating the application. The information of the application may include information about at least one of a service provided by the application, a type of the application, an execution screen of the application displayed on the electronic device 1000, or a content provided on the execution screen of the application.

The processor 2400 may collect user information by monitoring a user operation detected by the electronic device 1000. For example, the user operation may include at least one of an operation of inputting information through a touchpad provided by the electronic device 1000, an operation of inputting information through a button provided by the electronic device 1000, a gesture operation of the user, or an utterance operation of the user. The user information may include at least one of information input by the user according to the user operation, information selected by the user, or voice information of the user.

As at least one event is monitored, the processor 2400 may identify a first content and at least one UI component displayed on an execution screen of a first application executed in the electronic device 1000. The processor 2400 may obtain first state information of a first execution screen based on a result of identifying the first content and at least one UI component displayed on the execution screen of the first application.

The processor 2400 may identify a relationship between the first content provided on the first execution screen of the first application and a subsequent operation of the electronic device 1000 after the first content is provided, and obtain the first state information of the first execution screen of the first application based on the identification result.

For example, the first execution screen of the first application may include a screen displayed on the display 2300 according to an operation of the first application. The first execution screen of the first application may be changed according to information selected by the user in the execution screen.

For example, the subsequent operation of the electronic device may include an operation of receiving user input information through a UI component in the electronic device after the first content is provided, and an operation of executing a function or menu of the first application according to the user input information. For example, the user input information may include information input by the user through a UI component displayed on the execution screen of the first application. For example, the user input information may include information of a UI component selected by the user, text information input by the user through the UI component, function information or attribute information of a button pressed by the user through the UI component, and the like.

For example, the processor 2400 may identify the first content and at least one UI component provided on the execution screen of the first application based on the execution screen of the first application executed in the electronic device 1000. The processor 2400 may obtain first state information of the execution screen of the first application based on a result of identifying the first content and the at least one UI component. For example, the first state information may include information indicating that a state in which an event executed according to the user input information received through the at least one UI component may occur.

For example, the content provided on the execution screen of the first application is an advertisement, and a "Skip AD" icon may be displayed on the execution screen. The "Skip AD" icon may include a UI component for changing from an advertisement screen to a screen of a next content. The processor 2400 may obtain state information indicating that "Skip AD" is possible based on the advertisement provided on the execution screen of the first application and an attribute of the "Skip AD" icon.

For example, based on at least one of an execution screen of the first application executed in the electronic device 1000 or the user input information detected by the electronic device 1000, the processor 2400 may obtain relationship information indicating a correlation between the first content provided on the execution screen of the first application and the at least one UI component. The processor 2400 may obtain first state information of the execution screen of the first application based on the relationship information.

For example, based on the first content provided on the execution screen of the first application and the attribute of the first UI component in which the user input is sensed in the execution screen of the first application, the processor 2400 may obtain first state information of the execution screen of the first application indicating a state in which a function corresponding to the first UI component may be executed for the first content. In addition, the processor 2400 may obtain first state tag information indicating the first state information.

For example, the content provided on the execution screen of the first application may include a "must-eat restaurant" blog, and a "Share" icon may be included in the plurality of icons on the execution screen of the first application. When the user selects the "Share" icon, the processor 2400 may obtain state information indicating a state in which "share must-eat restaurant blog" may be executed based on attributes of the "must-eat restaurant" blog and the "Share" icon.

The processor 2400 may obtain a routine for executing a first task corresponding to the first state information based on the first state information and the usage pattern information of the applications for the user of the electronic device 1000.

For example, the usage pattern information of the applications may indicate usage information such as functions, items, and menus that the user repeatedly uses in the application. For example, when a function, item, or menu is used more than a preset number of times for a preset time, it may be determined that the function, item, or menu is used repeatedly. The processor 2400 may monitor operations of applications executed in the electronic device 1000 and collect usage pattern information of applications for the user.

For example, when a frequency of use for the "Skip AD" function is high during the execution of the application, the processor 2400 may extract "Skip AD" as a usage pattern, and generate "Skip AD" as usage pattern information when an advertisement is exposed while the application is running.

The processor 2400 may detect a routine matching the first state information from among a plurality of pre-stored routines. For example, the processor 2400 may detect a first routine among a plurality of preset routines based on usage pattern information of at least one application for the user, the first routine having state information that matches the first state information as an execution condition of the first task.

For example, the state information matching the first state information may be state information identical to the first state information or state information similar to the first state information. For example, the same state information as the first state information may include state information having the same state tag information as the state tag information of the first state information. In addition, the state information similar to the first state information may include state information having state tag information similar to the state tag information of the first state information. For example, the processor 2400 may determine the similarity between the state information by using a model for determining similarity. The model for determining similarity may include a model that determines similarity between state tag information. For example, the model for determining similarity may use a representation learning technique that displays state tag information in a spatial vector. When a degree of similarity between the state information calculated by the model for determining the similarity is equal to or greater than a preset value, it may be determined that there is similarity between the state information.

The processor 2400 may detect a first routine from among the plurality of routines, the first routine corresponding to a type of routine of the first application being executed in the electronic device and having the same state information as the first state information or state information similar to the first state information.

When the first routine having state information matching the first state information detected from among the plurality of routines includes a routine executed in a second application different from the first application, the processor 2400 may generate a second routine for executing the first task based on the first state information and the first routine. In other words, when the detected routine may not be directly applied to an application executed in the electronic device 1000, the processor 2400 may generate a similar routine that executes the same task as the detected routine.

The processor 2400 may obtain first usage pattern information of the first application for the user based on the result of monitoring the operation of the first application. Monitoring information of the first application obtained by monitoring the operation of the first application may include information on at least one content displayed on each execution screen of the first applications, user input information received through a UI component, information on a function executed in the first application according to user input information, and the like. In addition, the monitoring information of the first application may include information indicating a correlation between at least one content provided in each execution screen of the first application and a UI component used according to the at least one content. For example, the first usage pattern information may include information indicating a usage pattern for performing the first task. The processor 2400 may generate a first routine for performing the first task based on the usage pattern information of the first application.

For example, when the monitoring information of the first application is not collected, the processor 2400 may obtain monitoring information of the second application that provides the same or similar service as or to a service provided by the first application. In this case, a service similar to the service provided by the first application may be preset. The processor 2400 may predict usage pattern information of the first application based on the monitoring information of the second application. The processor 2400 may generate a first routine for performing the first task based on the usage pattern information of the first application.

The processor 2400 may execute the first task according to the routine. The processor 2400 may recommend execution of the routine. When an input of approving the recommendation of the routine is received, the processor 2400 may execute the first task.

Meanwhile, the processor 2400 may obtain state information of each of the execution screens of the applications based on a correlation between at least one content provided on each of the execution screens of the applications and UI components related to each of the execution screens of the applications. The processor 2400 may store state information of each of the execution screens of the applications in the memory.

For example, the processor 2400 may detect an area of the execution screen of the second application, from among the applications, in which a user input is received. The processor 2400 may obtain second state information of an execution screen of the second application based on a second content provided on the execution screen of the second application and an attribute of a second UI component having a user input detected in an area thereof. The processor 2400 may store second state tag information indicating an image of an area in which the second UI component is included, and the second state information.

For example, the processor 2400 may execute a UI component division mode. When the UI component division mode is executed in the electronic device 1000, the processor 2400 may divide a UI component in the execution screen and obtain relationship information indicating a correlation between a content and the UI component provided on the execution screen based on at least one of the execution screen displayed on the display 2300 or the user input information. The processor 2400 may obtain state information of the execution screen based on the relationship information. The processor 2400 may store the state information in the database 2540.

For example, the processor 2400 may obtain a command for executing the UI component division mode. For example, there may be a method of directly executing the UI component division mode and a method of automatically executing the UI component division mode. Taking the method of directly executing the UI component division mode as an example, the processor 2400 may obtain a voice such as "Enter UI component division mode" or obtain an input of selecting an icon for executing the UI component division mode in the execution screen, and execute the UI component division mode. Taking the method of automatically executing the UI component division mode as an example, the processor 2400 may execute the UI component division mode according to a preset interaction between the electronic device 1000 and the user. For example, the preset interaction may include an operation of touching the execution screen, an operation of clicking a button, and an operation of taking a gesture, but is not limited thereto.

The processor 2400 may record user input information and an interaction between the electronic device 1000 and the user, or may receive information on a UI component to be divided. The method of receiving the information on the UI component, for example, includes a method of directly designating an area by a user and a method of extracting an area of the execution screen in which a touch has occurred.

For example, when the method of directly designating the area by the user is described, the processor 2400 may receive a start input and an end input for area selection through an execution screen of the electronic device 1000. When the method of extracting the area where the touch has occurred in the execution screen is described, the processor 2400 may capture the execution screen at the moment when an interaction occurs between the electronic device 1000 and the user. The processor 2400 may obtain UI area information by obtaining information about a coordinate at which an event has occurred according to the interaction in the captured execution screen.

The processor 2400 may obtain relationship information indicating a correlation between a content and a UI component provided on the execution screen of the application based on at least one of the execution screen of the application or user input information detected in the electronic device 1000. The processor 2400 may obtain state information of the execution screen of the application based on the relationship information.

For example, when a "Skip AD" icon is displayed on the execution screen of the application and the user selects the "Skip AD" icon, the processor 2400 may obtain state information indicating that advertisement skipping is possible in the execution screen of the application including the "Skip AD" icon. In addition, the processor 2400 may obtain state tag information such as skip ad, omit advertisement, exclude advertisement, and the like with respect to the "Skip AD" icon.

The processor 2400 may store, in the database 2540, a UI component divided according to the UI component division mode, an image including the UI component, and state information.

Meanwhile, the processor 2400 may generate a complex routine in which operations of at least two applications are combined with each other. For example, the processor 2400 may generate a complex routine by combining routines of the at least two applications based on usage pattern information of the at least two applications. For example, the usage pattern information of the at least two applications may include information about a function that is repeatedly interlocked and used between the at least two applications. For example, the processor 2400 may call UI components for the routines of the at least two applications. The processor 2400 may display UI components and state tag information corresponding to the UI components. The processor 2400 may generate a complex routine by combining a routine corresponding to an execution condition of a task with a routine corresponding to a result of the task based on usage pattern information of at least two applications for the user and the state tag information corresponding to the UI components.

The processor 2400 may call UI components stored in the database 2540 in the memory 2500. The processor 2400 may obtain name information of a routine to be generated by the user. The processor 2400 may control the display 2300 to display state information including the UI components and state tag information corresponding to the UI components. The processor 2400 may modify the state tag information based on a user input. The processor 2400 may select at least two UI components among the UI components and generate a routine of the selected at least two UI components. The processor 2400 may select at least two UI components from among the UI components based on a user input or an artificial intelligence model. In addition, the processor 2400 may generate a routine having a same or similar state information as or to the generated routine based on the artificial intelligence model.

Meanwhile, the processor 2400 may generate a second routine of a second application based on the first routine generated according to the first state information of the first application. In this case, the second routine of the second application may include a routine having the same or similar state information as or to the first state information.

For example, the processor 2400 may generate the first routine for executing the first task based on the first state information of the first application. An event according to the first routine may include an event satisfying an execution condition, and an event indicating the execution result. The event satisfying the execution condition may include an event satisfying a condition for executing the first task. In addition, the event indicating the execution result may include an event in a state in which an execution of the first task is completed. The processor 2400 may obtain and store an execution screen of the first application or user input information that correspond to the event satisfying the execution condition. In addition, the processor 2400 may obtain and store state tag information of the event satisfying the execution condition.

For example, when an image of "seafood cuisine" is in the first application, the first routine may include a routine of selecting a "Like" icon. The processor 2400 may set, as the event satisfying the execution condition, an event in which an image of "seafood cuisine" is displayed on the execution screen of the first application, and an event in which a "Like" icon is displayed on the execution screen of the first application. In addition, the processor 2400 may set, as the event indicating the execution result, an event in which the "Like" icon is selected on the execution screen of the first application. For example, regarding the event satisfying the execution condition, the processor 2400 may obtain and store the name of the application, a social network service (SNS), photos, images, seafood, must-eat restaurant, octopus, shellfish, and the like as state tag information. In addition, the processor 2400 may obtain and store the icon, like, thumbs up, and the like as state tag information, regarding the event indicating the execution result.

The processor 2400 may monitor an event occurring in the electronic device 1000 in which the second application is executed. In this case, the event may include an operation detected in the electronic device 1000 as the user performs activity. As the event is monitored, the processor 2400 may obtain second state information based on the execution screen of the second application and the user input information. For example, the second state information may include information indicating the state of the execution screen of the second application based on a correlation between the content provided on the execution screen of the second application and the UI component related to the user input information. The processor 2400 may configure events corresponding to the second state information in a time-series manner and obtain state tag information for the events.

For example, the processor 2400 may detect an event in which an image of "seafood cuisine" is displayed on the execution screen of the second application and an icon of a heart shape is selected. The processor 2400 may detect an operation of executing the second application as a first event, detect an operation of displaying an execution screen including an image of "seafood cuisine" and an icon of a "heart shape" as a second event, and detect an operation of receiving an input of selecting the icon of the heart shape as a third event. The processor 2400 may obtain state tag information regarding the detected events. For example, the processor 2400 may obtain the name of the application, SNS, app, user app, etc. as state tag information of the first event, obtain photo, image, seafood, must-eat restaurant, octopus, travel, etc. as state tag information of the second event, and obtain icon, heart, like, etc. as state tag information of the third event.

The processor 2400 may verify similarity between the events of the second application detected according to the activity of the user and events corresponding to the first routine of the first application. For example, the processor 2400 may verify similarity between the events of the second application and the events corresponding to the first routine of the first application by using a similarity learning model. For example, the processor 2400 may determine, by using the similarity learning model, similarity of the category between the first application and the second application and determine similarity between the events corresponding to the first routine of the first application and the events of the second application.

When similarity is confirmed between the events of the second application and the events corresponding to the first routine, the processor 2400 may classify events of the second application into an event satisfying an execution condition of the second routine and an event indicating an execution result of the second routine based on the state information of the first routine. The processor 2400 may generate a second routine having the same state information or similar state information as or to the first routine based on the classified events.

Meanwhile, the communication interface 2100 may receive, from a server, a routine of the first application having state information matching the state information of the routine of the application installed in the electronic device 1000.

The processor 2400 may learn state information of at least one routine of the applications and an image corresponding to the state information of the at least one routine. Based on a result of the learning, the processor 2400 may update a learning model for recommending a routine according to the state information of the application.

Figure 3:
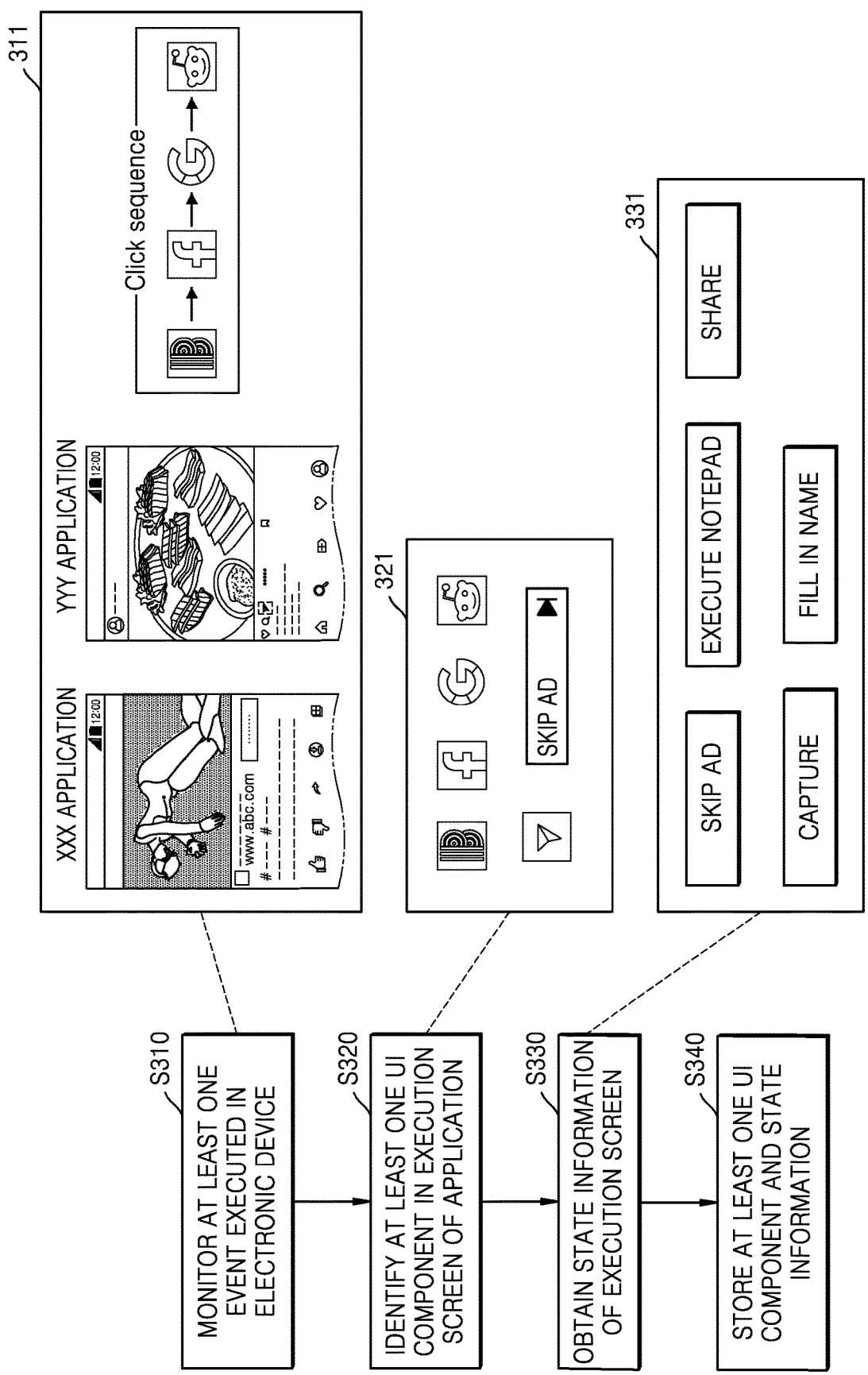
FIG. 3 is a diagram illustrating a process of storing a UI component and state information, according to an embodiment of the disclosure.

FIG. 3 is a diagram illustrating a process of storing a UI component and state information, according to an embodiment of the disclosure.

Referring to FIG. 3, in operation S310, the electronic device 1000 may monitor at least one event executed in the electronic device 1000. For example, the event may include an operation of executing an application, an operation of providing an execution screen in the application, an operation of receiving user input information by the electronic device 1000, and the like. For example, referring to a block 311 of FIG. 3, the electronic device 1000 may detect an operation of executing an XXX application and an operation of executing an YYY application among a plurality of applications installed in the electronic device 1000. In addition, when a plurality of applications are executed in the electronic device 1000, the electronic device 1000 may monitor an order in which the plurality of applications are executed, functions executed in the plurality of applications, information selected by the user, information input by the user, and the like.

In operation S320, the electronic device 1000 may identify at least one UI component in the execution screen of the application. For example, the electronic device 1000 may identify a UI component displayed on the execution screen of the application and a UI component used by the user on the execution screen of the application. For example, referring to a block 321 of FIG. 3, the electronic device 1000 may detect a UI component for executing an application and a UI component for executing a function in the application.

In operation S330, the electronic device 1000 may obtain state information of the execution screen. For example, the electronic device 1000 may identify a content displayed on the execution screen of the application and a subsequent operation of the electronic device 1000 for the content, and obtain state information indicating a relationship between the content and the subsequent operation of the electronic device 1000 for the content. The electronic device 1000 may obtain state tag information including words, keywords, phrases, sentences, and the like indicating the state information. For example, referring to a block 331 of FIG. 3, the electronic device 1000 may obtain state tag information such as "skip ad", "run notepad", "share", "capture", and "fill name", and the like based on a result of identifying the content displayed on the execution screen of the application and the subsequent operation of the electronic device 1000 with respect to the content.

For example, when an advertisement is played in the execution screen of the XXX application and a "Skip AD" icon is displayed, the user may skip the advertisement by clicking the "Skip AD" icon. In this case, the electronic device 1000 may identify the advertisement played on the execution screen as a content, identify the "Skip AD" icon as a UI component, and identify an operation of receiving an input for selecting a "Skip AD" icon as a subsequent operation of the electronic device 1000 for the content. Based on the identification result, the electronic device 1000 may obtain state information "when an advertisement is played on the execution screen of the XXX application, skip the advertisement". In addition, the electronic device 1000 may obtain state tag information including a word or keyword representing the state information. The electronic device 1000 may obtain state tag information of "skip ad".

In operation S340, the electronic device 1000 may store at least one UI component and state information. For example, the electronic device 1000 may store an image representing the at least one UI component, an image including the at least one UI component, and information on content related to the at least one UI component, state information related to the at least one UI component, state tag information related to the at least one UI component, and the like. In addition, the electronic device 1000 may map and store information representing the at least one UI component and state information related to the at least one UI component.

Meanwhile, the electronic device 1000 may obtain usage pattern information of the application based on a result of monitoring at least one event executed in the electronic device 1000. For example, the electronic device 1000 may determine at least one of a function, an item, or a menu, which is frequently used in the application as a usage pattern, based on a result of monitoring the at least one event, and obtain usage pattern information. The electronic device 1000 may generate a routine corresponding to the usage pattern information based on the usage pattern information.

Figure 4:
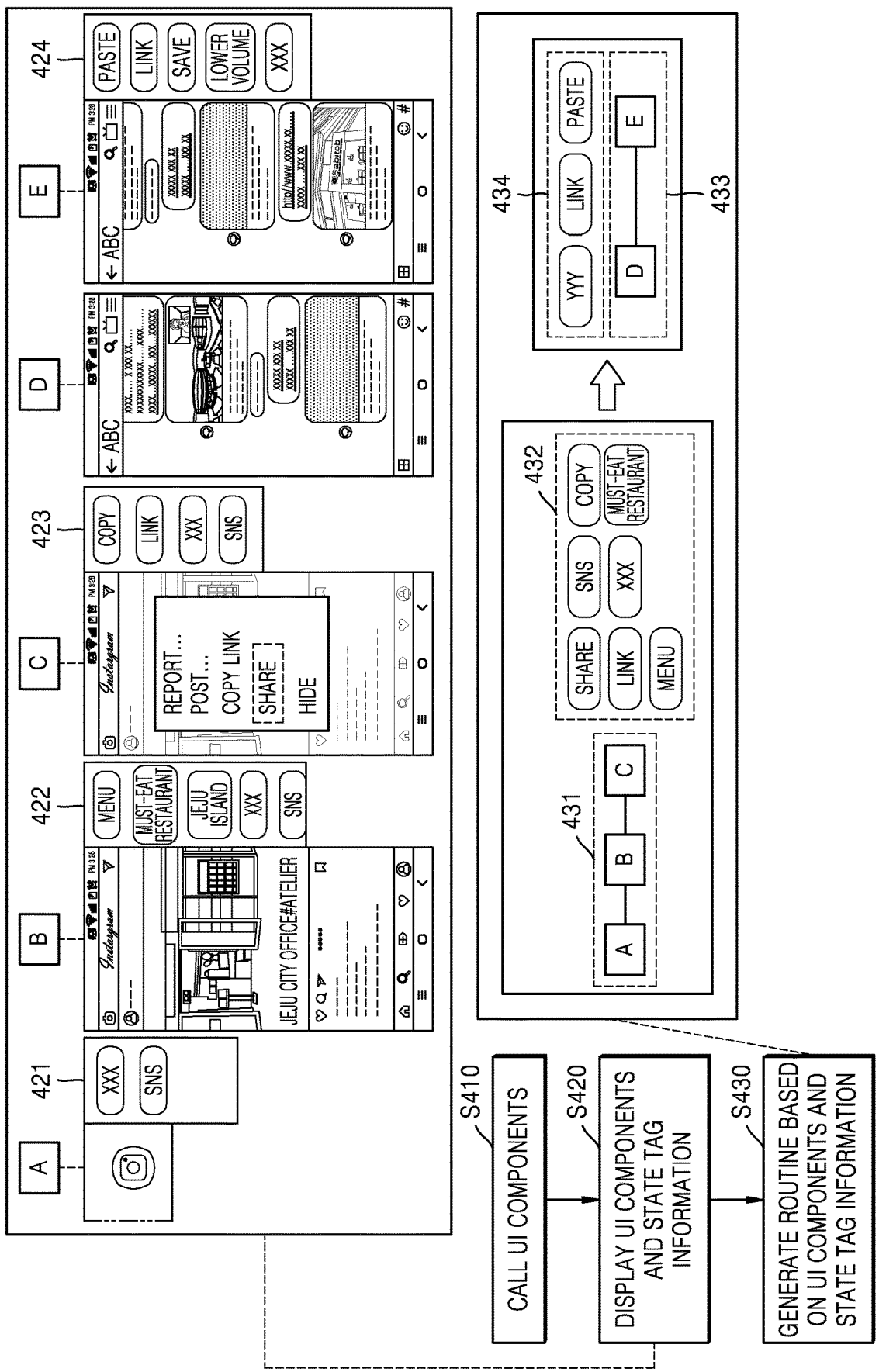
FIG. 4 is a diagram illustrating a process of generating a routine based on a UI component and state information, according to an embodiment of the disclosure.

FIG. 4 is a diagram illustrating a process of generating a routine based on a UI component and state information, according to an embodiment of the disclosure.

In order to perform a task in the electronic device 1000, a continuous operation between two or more applications may be required. The electronic device 1000 may generate a complex routine by combining routines of each application. For example, the task may be "share a content provided by the XXX application to an account of a specific user of the YYY application". The electronic device 1000 may combine a first routine of "sharing a content provided by the XXX application to the YYY application" with a second routine of "sharing a content provided by the YYY application to the account of a specific user" to generate a complex routine of "sharing a content provided by the XXX application to the YYY application".

For example, referring to FIG. 4, in operation S410, the electronic device 1000 may call UI components. For example, the electronic device 1000 may display a list including information of a preset routine in each of the plurality of applications. Based on the list, the electronic device 1000 may receive an input for selecting routines that may be used to perform a task. The electronic device 1000 may call UI components corresponding to the selected routines.

For example, the electronic device 1000 may receive an input for selecting the first routine of "sharing a content provided by the XXX application to the YYY application" and the second routine of "share a content provided by the YYY application to the account of a specific user" from among the plurality of routines. The electronic device 1000 may call UI components corresponding to the first routine and the second routine.

In operation S420, the electronic device 1000 may display the UI components and state tag information. For example, the electronic device 1000 may display an execution screen of an application corresponding to the selected routines and state tag information on an execution screen of an application. The execution screen of the application may include a UI component used to perform a task.

For example, the electronic device 1000 may display an execution screen A, an execution screen B, and an execution screen C that are related to the first routine of "share a content provided by the XXX application to the YYY application". In addition, the electronic device 1000 may display state tag information 421 of the execution screen A, state tag information 422 of the execution screen B, and state tag information 423 of the execution screen C. In addition, the electronic device 1000 may display an execution screen D and an execution screen E that are related to the second routine of "share a content provided by the YYY application to the account of a specific user". In addition, the electronic device 1000 may display state tag information 424 of the execution screen D and the execution screen E.

In operation S430, the electronic device 1000 may generate a routine based on the UI component and the state tag information. For example, in order to perform a task, the electronic device 1000 may determine an operation of the electronic device 1000 corresponding to a condition event and determine an operation of the electronic device 1000 corresponding to a result event. The electronic device 1000 may determine a UI component and state tag information corresponding to the condition event. The electronic device 1000 may determine a UI component and state tag information corresponding to the result event. The electronic device 1000 may generate a complex routine by combining a routine corresponding to the condition event with a routine corresponding to the result event.

In addition, the electronic device 1000 may receive an input for modifying state tag information on an execution screen of an application. The electronic device 1000 may generate a routine based on the modified state tag information.

For example, the electronic device 1000 may determine an operation of the electronic device 1000 according to the execution screen A, the execution screen B, and the execution screen C as a condition event 431, and may generate state tag information 432 corresponding to the condition event 431. In addition, the electronic device 1000 may determine the operation of the electronic device 1000 according to the execution screen D and the execution screen E as a result event 433, and may generate state tag information 434 corresponding to the result event 433. The electronic device 1000 may generate a complex routine of "share a content provided by the XXX application to the YYY application" by combining the routine corresponding to the condition event 431 with the routine corresponding to the result event 433.

Figure 5:
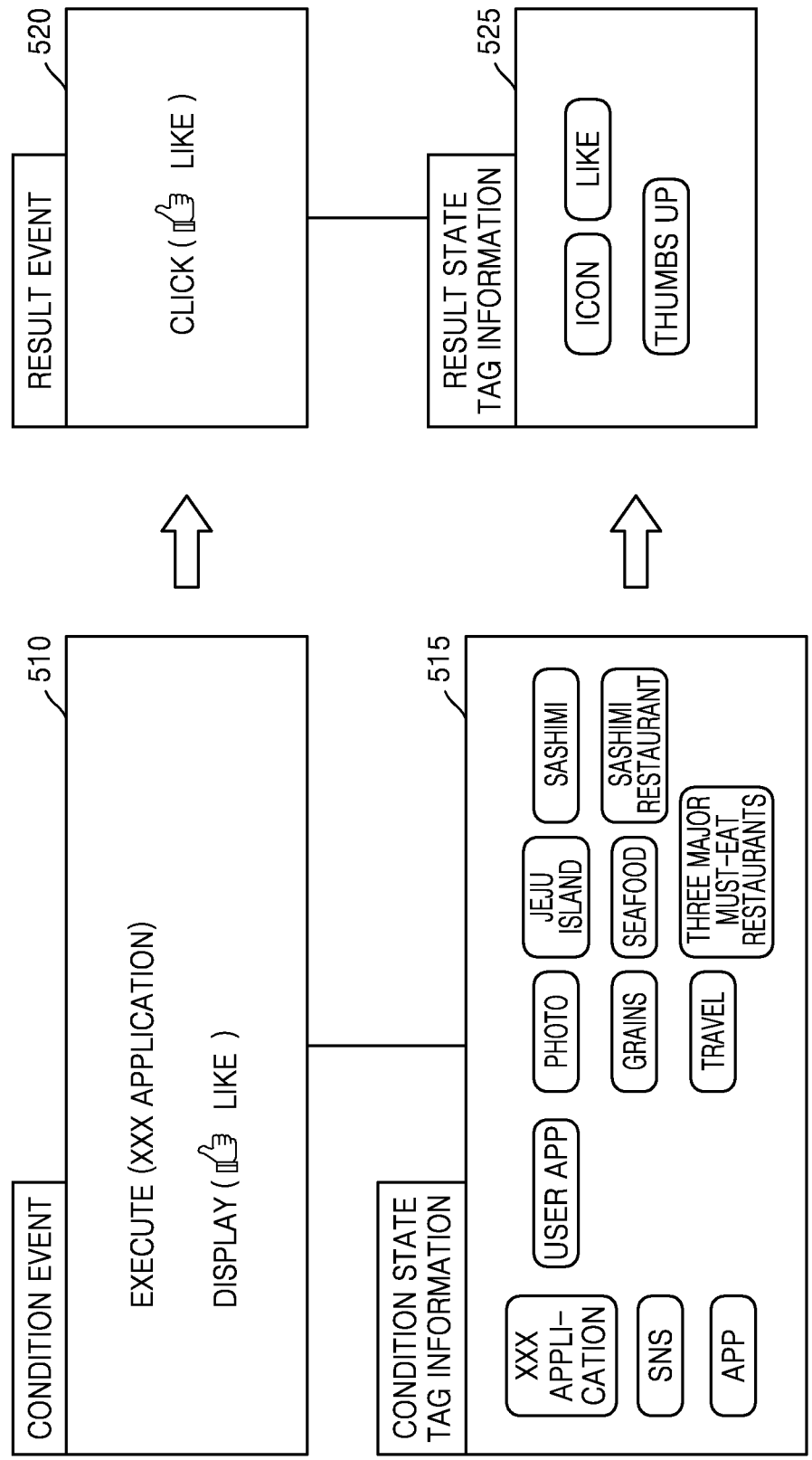
FIG. 5 is a diagram illustrating a routine of a first application according to an embodiment of the disclosure.

FIG. 5 is a diagram illustrating a routine of a first application according to an embodiment of the disclosure.

For example, the electronic device 1000 may set functions, menus, etc. frequently used by a user in the application as a routine. For example, the electronic device 1000 may obtain application usage pattern information for the user based on a result of monitoring an operation of the application. For example, the application usage pattern information for the user may include information indicating a usage pattern of a function or menu frequently used by a user in the application, or a usage pattern of a function frequently used in the application in association with other applications. The electronic device 1000 may generate a routine corresponding to the usage pattern based on the application usage pattern information for the user.

For example, the electronic device 1000 may obtain information on a condition event that satisfies an execution condition of the routine and a result event indicating an execution result of the routine. The electronic device 1000 may obtain an execution screen corresponding to a condition event that satisfies the execution condition of the routine and an execution screen corresponding to a result event indicating an execution result. The electronic device 1000 may obtain relationship information indicating a correlation between a content provided on the execution screen corresponding to the condition event and UI components provided on the execution screen corresponding to the condition event. The electronic device 1000 may obtain state information corresponding to the condition event based on the relationship information. The electronic device 1000 may map and store a condition event with state tag information corresponding to the condition event. In addition, the electronic device 1000 may obtain relationship information indicating a correlation between a content provided on the execution screen corresponding to the result event and UI components provided on the execution screen corresponding to the result event. The electronic device 1000 may obtain state information corresponding to the result event based on the relationship information. The electronic device 1000 may map and store a result event with state tag information corresponding to the result event. When an event matching the condition event is detected in the electronic device 1000, the electronic device 1000 may generate a routine in which an event matching the result event is executed in the electronic device 1000.

Referring to FIG. 5, based on a result of monitoring the execution screen of the XXX application, the electronic device 1000 may obtain information on an operation of clicking "like" in a seafood cuisine content as first usage pattern information. Based on the first usage pattern information, the electronic device 1000 may determine an event in which a content for seafood cuisine is displayed in the XXX application as a condition event 510. In addition, the electronic device 1000 may determine an event of clicking "like" as a result event 520 based on the first usage pattern information.

The electronic device 1000 may obtain condition state tag information 515 corresponding to the condition event 510 based on at least one execution screen that provides a content about seafood cuisine in the XXX application and a UI component that receives user input information on the at least one execution screen. For example, the XXX application, SNS, app, user app, etc. may be obtained as state tags for an event of executing the XXX application in the electronic device 1000. In addition, photos, Jeju Island, sashimi, grains, seafood, sushi restaurant, travel, three major must-eat restaurants, etc. may be obtained as state tags for events for providing a content about seafood cuisine.

The electronic device 1000 may obtain result state tag information 525 corresponding to the result event 520 based on at least one execution screen corresponding to the operation of clicking "like". For example, an icon, like, thumbs up, etc. may be obtained as state tags for the event of clicking "like".

The electronic device 1000 may generate a routine in which the event of clicking "like" is executed when an event for providing a content about seafood cuisine in the XXX application is detected.

When a routine is generated in the electronic device 1000 and a condition event that satisfies an execution condition of the routine is detected, the electronic device 1000 may execute a result event indicating an execution result of the routine.

Figure 6:
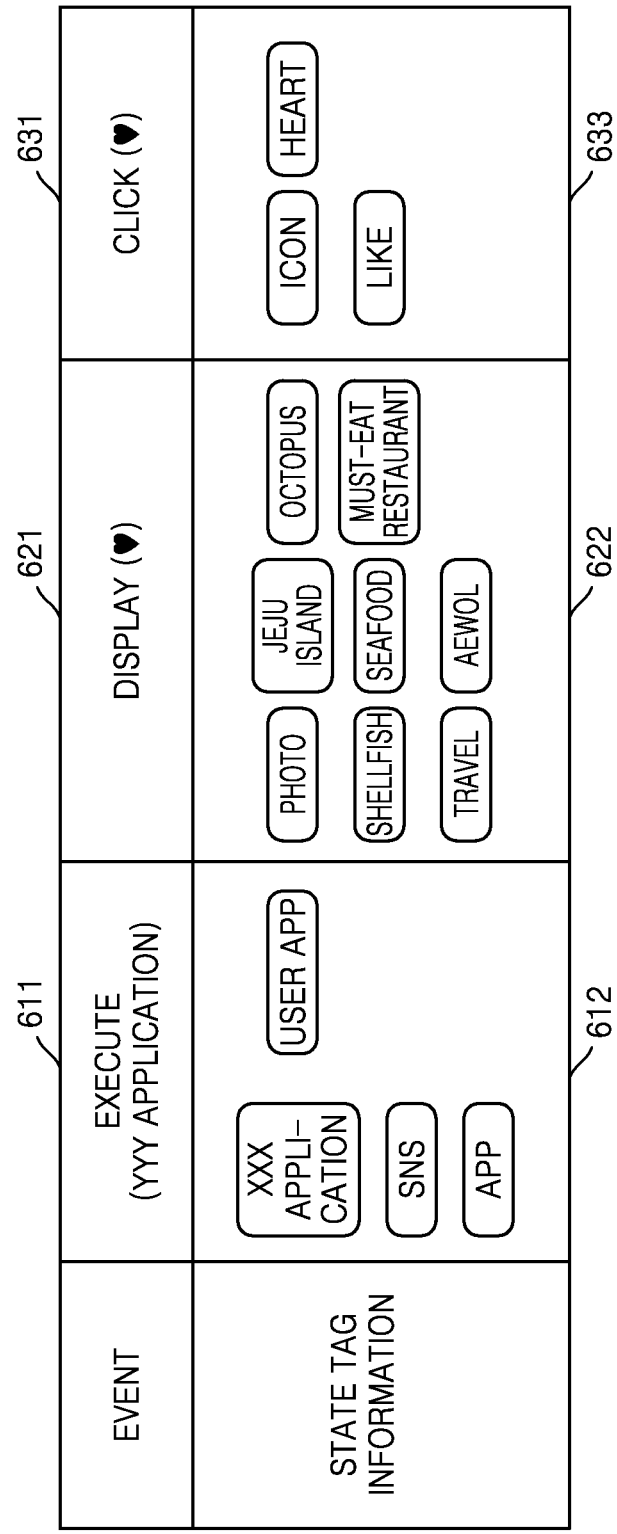
FIG. 6 is a diagram illustrating a process of generating, based on a result of monitoring an event occurring in the electronic device, information and state tag information of an electronic device when a second application different from a first application is executed in the electronic device, according to an embodiment of the disclosure.

FIG. 6 is a diagram illustrating a process of generating information and state tag information of an electronic device 1000 based on a result of monitoring an event occurring in the electronic device 1000, when a second application different from a first application is executed in the electronic device 1000, according to an embodiment of the disclosure.

The electronic device 1000 may obtain information on the electronic device 1000 and state tag information corresponding to the information on the electronic device 1000 based on a result of monitoring an execution screen of the second application.

For example, the electronic device 1000 may obtain usage pattern information of the second application including information on functions frequently used by the user in the second application based on the result of monitoring the execution screen of the second application. For example, when a function is used more than a certain number of times for a certain period of time, the function may be determined as a function frequently used by the user. For example, the usage pattern information of the second application may include information on the electronic device 1000 and state tag information corresponding to the information on the electronic device 1000. The information of the electronic device 1000 may indicate information about an event occurring in the electronic device 1000.

Referring to FIG. 6, the electronic device 1000 may obtain information on an operation of clicking "like" in a seafood cuisine content as second usage pattern information based on the result of monitoring the execution screen of the YYY application. The electronic device 1000 may obtain information on a plurality of events and state tag information on the plurality of events based on the second usage pattern information.

For example, the electronic device 1000 may obtain information on a first event 611 in which the YYY application is executed, a second event 621 in which a content about seafood cuisine is provided in the YYY application, and a third event 631 of clicking "like".

For example, the YYY application, SNS, app, user app, etc. may be obtained as state tags 612 for the first event 611. In addition, photos, Jeju Island, octopus, shellfish, seafood, must-eat restaurant, travel, Aewol, etc. may be obtained as state tags 622 for the second event 621. In addition, an icon, like, heart, etc. may be obtained as state tags 633 for the third event 631.

Figure 7:
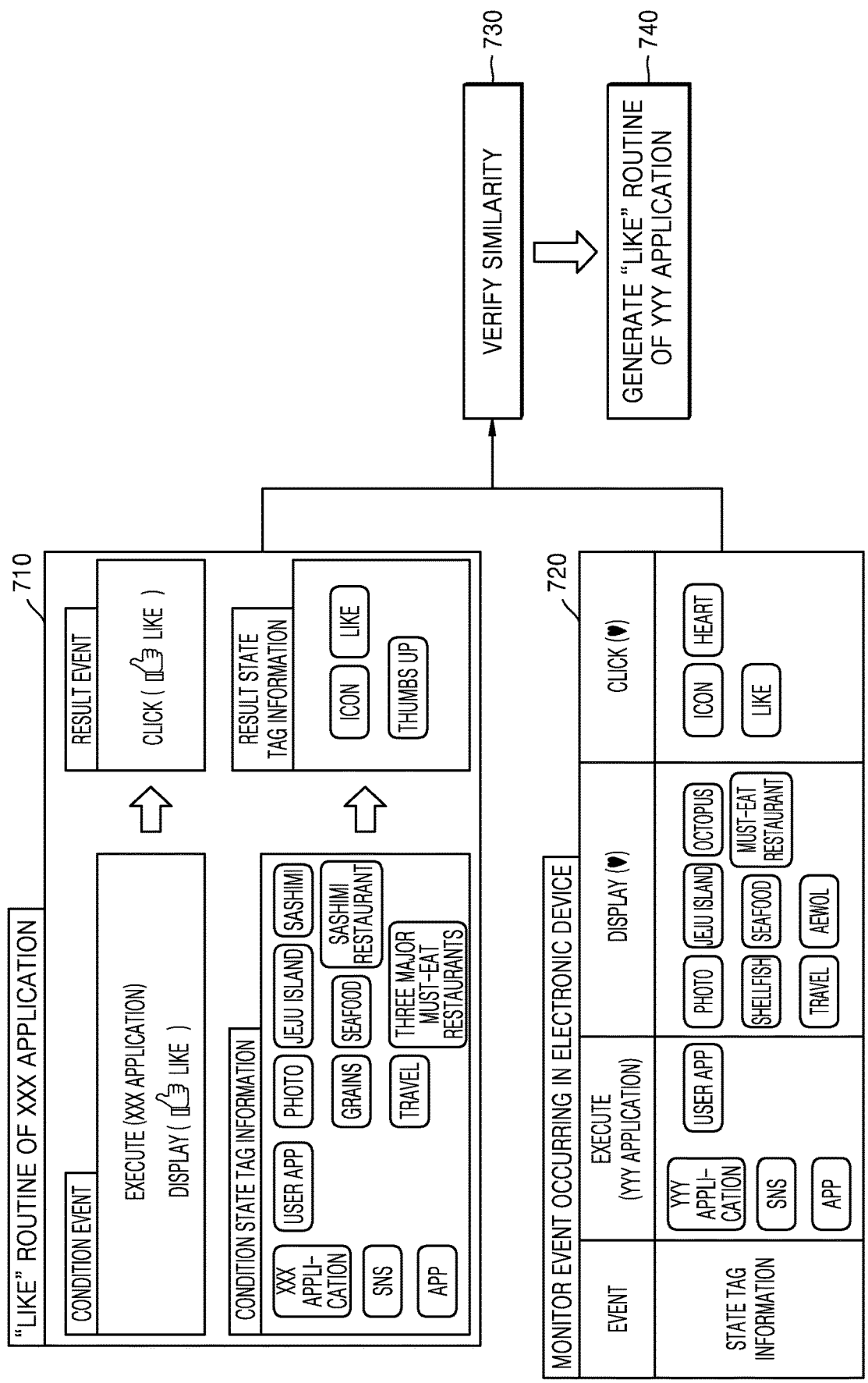
FIG. 7 is a diagram illustrating a process of generating a routine of a second application based on a routine of a first application, according to an embodiment of the disclosure.

FIG. 7 is a diagram illustrating a process of generating a routine of a second application based on a routine of a first application, according to an embodiment of the disclosure.

Referring to a block 710 of FIG. 7, as described with reference to FIG. 5, the electronic device 1000 may generate a routine in which an event of clicking "like" is executed when an event for providing a seafood cuisine content in the XXX application is detected in the electronic device 1000. The electronic device 1000 may set the generated routine as a first routine of the XXX application.

Referring to a block 720 of FIG. 7, the electronic device 1000 may obtain monitoring information of the YYY application. For example, as described with reference to FIG. 6, the electronic device 1000 may obtain event information and state tag information on the operation of clicking "like" in the seafood cuisine content based on a result of monitoring an execution screen of the YYY application.

Referring to a block 730 of FIG. 7, the electronic device 1000 may compare an operation of the electronic device 1000 with respect to the first routine of the XXX application with an operation of the electronic device 1000 obtained from the monitoring information of the YYY application. Based on the comparison result, the electronic device 1000 may verify similarity between the operation of the electronic device 1000 for the YYY application and the operation of the electronic device 1000 for the first routine of the XXX application.

For example, the electronic device 1000 may identify similarity between the XXX application and the YYY application. The electronic device 1000 may verify the similarity between applications based on a result of comparing at least one of an application type, an application function, or a service provided by an application. For example, when the XXX application and the YYY application are SNS, the electronic device 1000 may recognize the similarity between the XXX application and the YYY application.

When the similarity between the XXX application and the YYY application is recognized, the electronic device 1000 may verify the similarity between the operation of the electronic device 1000 for the first routine and the operation of the electronic device 1000 obtained from monitoring information of the YYY application. For example, the electronic device 1000 may verify similarity between the state tag information for the first routine and the state tag information for the monitoring information.

For example, the state tag information for the first routine may be condition state tag information 515 corresponding to the condition event 510, and result state tag information 525 corresponding to the result event 520. The state tag information for the monitoring information may include state tag information including a state tag 612 for the first event 611, a state tag 622 for the second event 621, and a state tag 633 for the third event 631.

For example, the electronic device 1000 may verify the similarity between the state tag information for the first routine and the state tag information for the monitoring information based on a text and image included in the state tag information.

For example, when a degree of redundancy between the text information included in the state tag information satisfies a criterion or a degree of redundancy between information indicated by the image included in the state tag information satisfies the criterion, the electronic device 1000 may recognize the similarity between the state tag information for the first routine and the state tag information for the monitoring information. For example, the criterion may be expressed as a probability representing a numerical value.

Meanwhile, the degree of redundancy among text information included in the state tag information may be determined based on a matching rate for words, keywords, phrases, and sentences included in the state tag information, and a similarity rate of meanings indicated by the text. For example, the degree of redundancy between information indicated by the image included in the state tag information may be determined based on a similarity rate of meaning indicated by the image. For example, an image marked with "like" and the image marked with "heart" represent positive meaning and may be determined to be similar.

For example, as a result of comparing the condition state tag information 515 corresponding to the condition event 510 with the state tag information including the state tag 612 for the first event 611 and the state tag 622 for the second event 621, the electronic device 1000 may determine that seven state tags (SNS, app, user app, photo, Jeju Island, seafood, and travel) of the 12 state tags match and five state tags (YYY application, octopus, shellfish, must-eat restaurant, Aewol) of the 12 state tags are similar.

In addition, as a result of comparing the result state tag information 525 corresponding to the result event 520 with the state tag information including the state tag 633 for the third event 631, the electronic device 1000 may determine that two state tags (icon and like) of the three state tags match, and that one state tag (heart) of the three state tags is similar.

For example, the electronic device 1000 may verify similarity of the state tag information by using a natural language processing model that determines whether words or sentences have similar meanings. For example, the natural language processing model may calculate a vector for a word by arranging the word in a three-dimensional space. The natural language processing model may calculate vectors for a plurality of words. The natural language processing model may learn words having similar meanings based on vectors of words having similar meanings among the plurality of words. The natural language processing model may determine similarity between predetermined words as a result of learning words having similar meanings. The higher the similarity between words, the higher the similarity value may be.

The electronic device 1000 may determine that the similarity between the condition state tag information 515 corresponding to the condition event 510 and the state tag information including the state tag 612 for the first event 611 and the state tag 622 for the second event 621 is high, based on the natural language processing model. In addition, based on the natural language processing model, the electronic device 1000 may determine that the similarity between the result state tag information 525 corresponding to the result event 520 and the state tag information including the state tag 633 for the third event 631 is high. The electronic device 1000 may identify similarity between the operation of the electronic device 1000 for the YYY application and the operation of the electronic device 1000 for the first routine of the XXX application.

Referring to a block 740 of FIG. 7, the electronic device 1000 may generate a routine of the YYY application based on the first routine of the XXX application. The electronic device 1000 may generate a condition event and condition state tag information for the YYY application based on the condition state tag information 515 corresponding to the condition event 510. In addition, the electronic device 1000 may generate a result event and result state tag information for the YYY application based on the result state tag information 525 corresponding to the result event 520. When an event for providing a content for seafood in the YYY application is detected in the electronic device 1000, the electronic device 1000 may generate a routine in which an event of clicking "like" is executed based on the generated condition event and result event. A process of generating a routine of the YYY application is described with reference to FIG. 8.

Meanwhile, a server may obtain information on the first routine of the XXX application and the monitoring information of the YYY application from the electronic device 1000. The server may perform the same operation as the operations of the electronic device 1000 described in the block 730 and the block 740.

Figure 8:
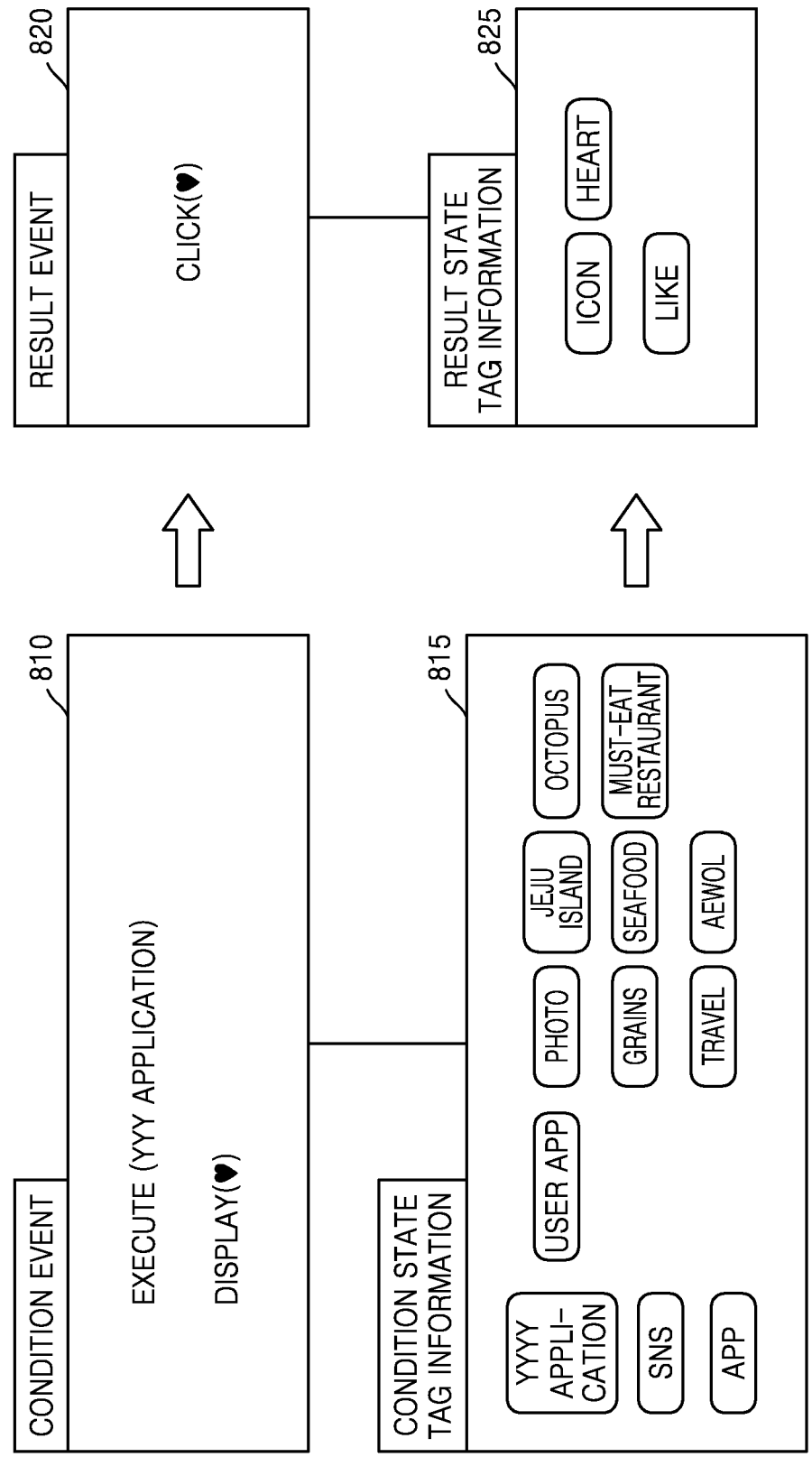
FIG. 8 is a diagram illustrating a routine of a second application according to an embodiment of the disclosure.

FIG. 8 is a diagram illustrating a routine of a second application according to an embodiment of the disclosure.

The electronic device 1000 may obtain state tag information corresponding to the condition state tag information 515 corresponding to the condition event 510 of the first routine of the XXX application from among the state tag information for the monitoring information of the YYY application. As described with reference to FIGS. 6 and 7, the electronic device 1000 may determine that the state tag information including the state tag 612 for the first event 611 and the state tag 622 for the second event 621 matches the condition state tag information 515 corresponding to the condition event 510 of the first routine. The electronic device 1000 may determine the first event 611 and the second event 621 as condition events 810. The electronic device 1000 may determine state tag information including a state tag 612 for the first event 611 and the state tag 622 for the second event 621 as condition state tag information 815 for the condition event 810.

The electronic device 1000 may obtain state tag information corresponding to the result state tag information corresponding to the result event 520 of the first routine of the XXX application from among the state tag information for the monitoring information of the YYY application. As described with reference to FIGS. 6 and 7, the electronic device 1000 may determine that the state tag information including the state tag 633 for the third event 631 matches the result state tag information 525 corresponding to the result event 520 of the first routine. The electronic device 1000 may determine the third event 631 as a result event 820. The electronic device 1000 may determine the state tag information including the state tag 633 for the third event 631 as a result state tag information 825 of the result event 820.

The electronic device 1000 may generate a second routine in which an event of clicking "like" is executed when an event for providing a content for seafood in the YYY application is detected in the electronic device 1000, based on the generated condition event 810 and result event 820.

Figure 9:
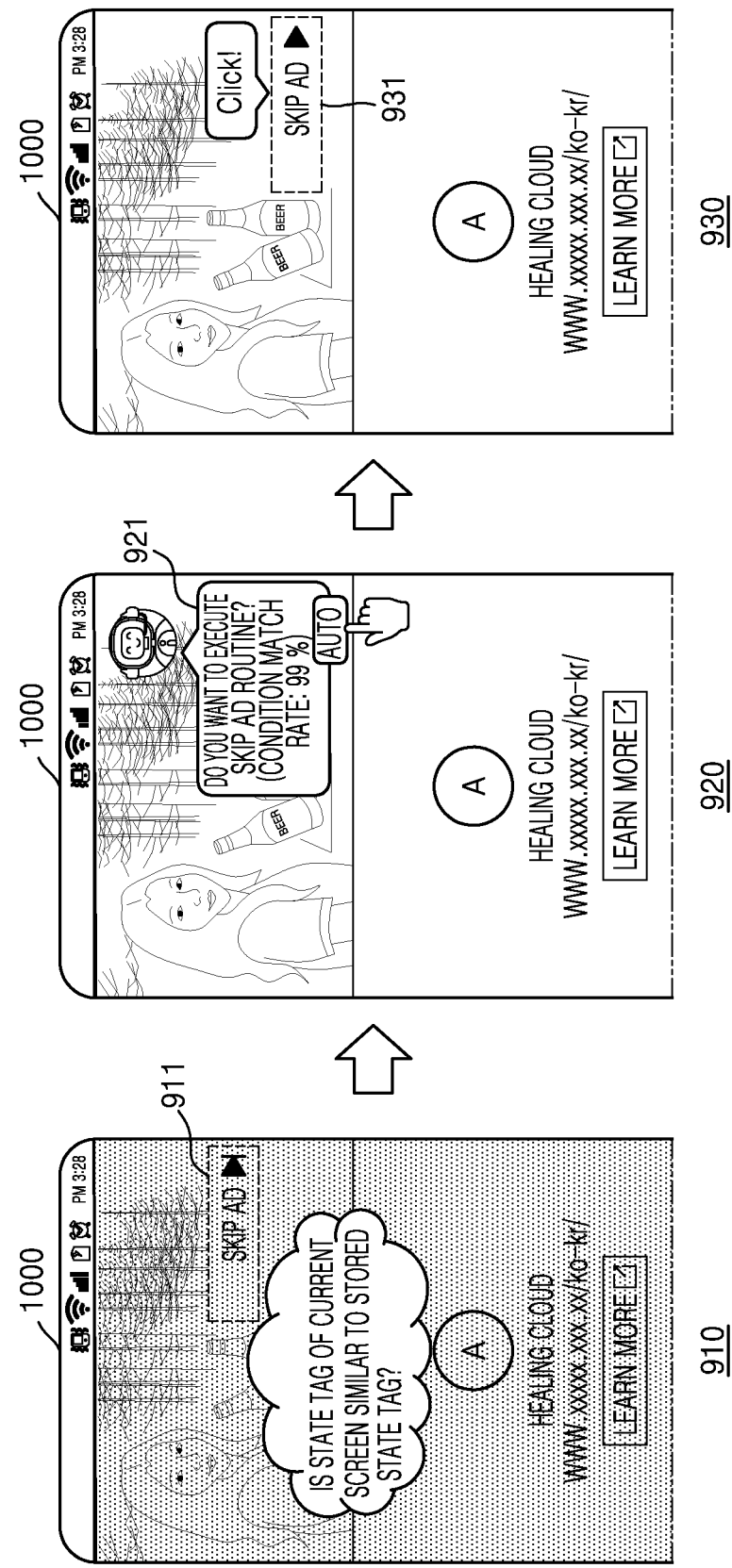
FIG. 9 is a diagram illustrating a process of executing a routine for performing advertisement skipping in an electronic device, according to an embodiment of the disclosure.

FIG. 9 is a diagram illustrating a process of executing a routine for skipping advertisements in the electronic device 1000, according to an embodiment of the disclosure.

For example, a routine (hereinafter, a skip ad routine) for skipping advertisements may be set in the electronic device 1000. The skip ad routine may include a routine for an operation of skipping an advertisement instead of playing the advertisement until the advertisement ends, when the advertisement is played on the execution screen of the electronic device 1000.

Referring to a part 910 of FIG. 9, a first application may be executed in the electronic device 1000, and an advertisement may be played on an execution screen of the first application. While the advertisement is being played, a skip AD icon 911 may be displayed on the execution screen of the first application.

The electronic device 1000 may identify an advertisement and the skip AD icon 911 displayed on the execution screen of the first application, and obtain first state information of the first application. The electronic device 1000 may obtain first state information indicating a state in which an advertisement is played and the skip AD icon 911 is provided on the execution screen of the first application. The electronic device 1000 may obtain first state tag information of the first state information. For example, the first state tag information may include information of a state tag including the first application, the advertisement, and the skip ad.

The electronic device 1000 may detect a skip ad routine having state information matching the first state information from among the plurality of routines. For example, the electronic device 1000 may determine whether the first state tag information for the execution screen of the first application is similar to state tag information of the skip ad routine.

When the first state tag information is similar to the state tag information of the skip ad routine, as shown in a part 920 of FIG. 9, the electronic device 1000 may display a message 921 inquiring whether to execute the skip ad routine. For example, the message 921 may include information indicating a match rate between the first state tag information and the state tag information of the skip ad routine. For example, the match rate may indicate a match rate between the first state tag information and state tag information of a condition event that satisfies an execution condition of the skip ad routine. The electronic device 1000 may receive an input requesting execution of the skip ad routine based on the message 921.

Referring to a part 930 of FIG. 9, when an input requesting execution of the skip ad routine is received, the electronic device 1000 may execute the skip ad routine. The electronic device 1000 may automatically execute an operation, 931, of clicking the skip AD icon 911 displayed on the execution screen of the first application.

Meanwhile, whether or not the skip ad routine is executed may vary depending on the application in which the advertisement is played, the type and content of the advertisement, and the like. For example, the skip ad routine may be set to operate in the first application. When an advertisement is played on the execution screen of the first application while the first application is being executed, the electronic device 1000 may automatically execute the skip ad routine. In addition, when an advertisement is played on the execution screen of the second application while the second application is being executed, the electronic device 1000 may display a message inquiring whether to execute the skip ad routine. When an input for executing the skip ad routine is received, the electronic device 1000 may modify an application target range of the skip ad routine to include the second application or generate a skip ad routine for the second application.

For example, the skip ad routine may be set to operate when a cosmetic advertisement is played. When a car advertisement is played on the execution screen of the first application while the first application is being executed, the electronic device 1000 may not execute the skip ad routine. On the other hand, while the first application is running, when a perfume advertisement is played on the execution screen of the first application, the electronic device 1000 may determine that the cosmetic advertisement and the perfume advertisement are similar, and display a message inquiring whether to execute the skip ad routine. When an input is received indicating that the skip ad routine is executed, the electronic device 1000 may modify the application target range of the skip ad routine to include perfume advertisements or generate a perfume skip ad routine for the first application.

Figure 10:
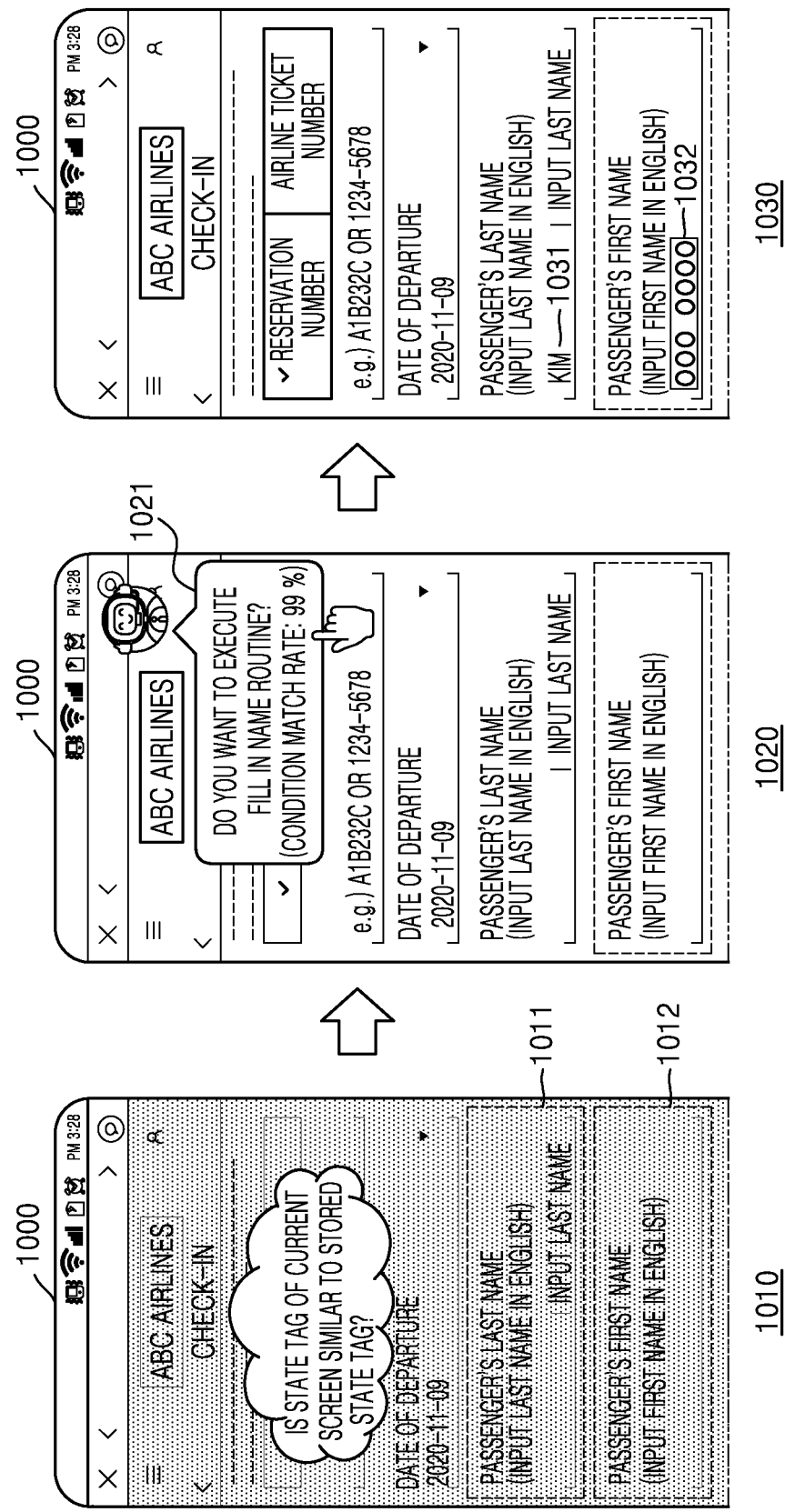
FIG. 10 is a diagram illustrating a process of executing a routine for performing name filling in an electronic device, according to an embodiment of the disclosure.

FIG. 10 is a diagram illustrating a process of executing a routine for performing name filling in the electronic device 1000, according to an embodiment of the disclosure.

Referring to a part 1010 of FIG. 10, an ABC Airlines application may be executed in the electronic device 1000, and an input field for inputting check-in information may be provided on an execution screen of the ABC Airlines application. The input field for inputting check-in information may include a passenger's last name input field 1011 and a passenger's first name input field 1012. For the ABC Airlines application, a routine (hereinafter, a fill in name routine) for performing name filling may be set. The fill in name routine may include a routine for automatically recording first and last names when there is a request to fill in the passenger's first and last names on the execution screen of the ABC Airlines application.

As a result of identifying the execution screen of the ABC Airlines application, the electronic device 1000 may obtain second state information indicating a state of requesting check-in information. The second state information may also include information indicating a state of requesting to fill in the passenger's first and last names. The electronic device 1000 may obtain second state tag information including state tags such as the passenger's first name, last name, input first name, and fill in first name.

The electronic device 1000 may detect a fill in name routine having state information matching the second state information from among the plurality of routines. For example, the electronic device 1000 may determine whether the second state tag information for the execution screen of the ABC Airlines application is similar to state tag information of the fill in name routine.

When the second state tag information for the execution screen of the ABC Airlines application is similar to the state tag information of the fill in name routine, as shown in a part 1020 of FIG. 10, the electronic device 1000 may display a message 1021 inquiring whether to execute the fill in name routine. For example, the message 1021 may include information indicating a match rate between the second state tag information and the state tag information of the fill in name routine. For example, the match rate may be about 99%. The electronic device 1000 may receive an input requesting execution of the fill in name routine based on the message 1021.

Referring to part 1030 of FIG. 10, when the input requesting execution of the fill in name routine is received, the electronic device 1000 may execute the fill in name routine. The electronic device 1000 may automatically execute an operation, 1031, of recording the user's last name in the passenger's last name input field 1011 displayed on the execution screen of the ABC Airlines application, and an operation, 1032, of recording the user's first name in the passenger's first name input field 1012.

Figure 11:
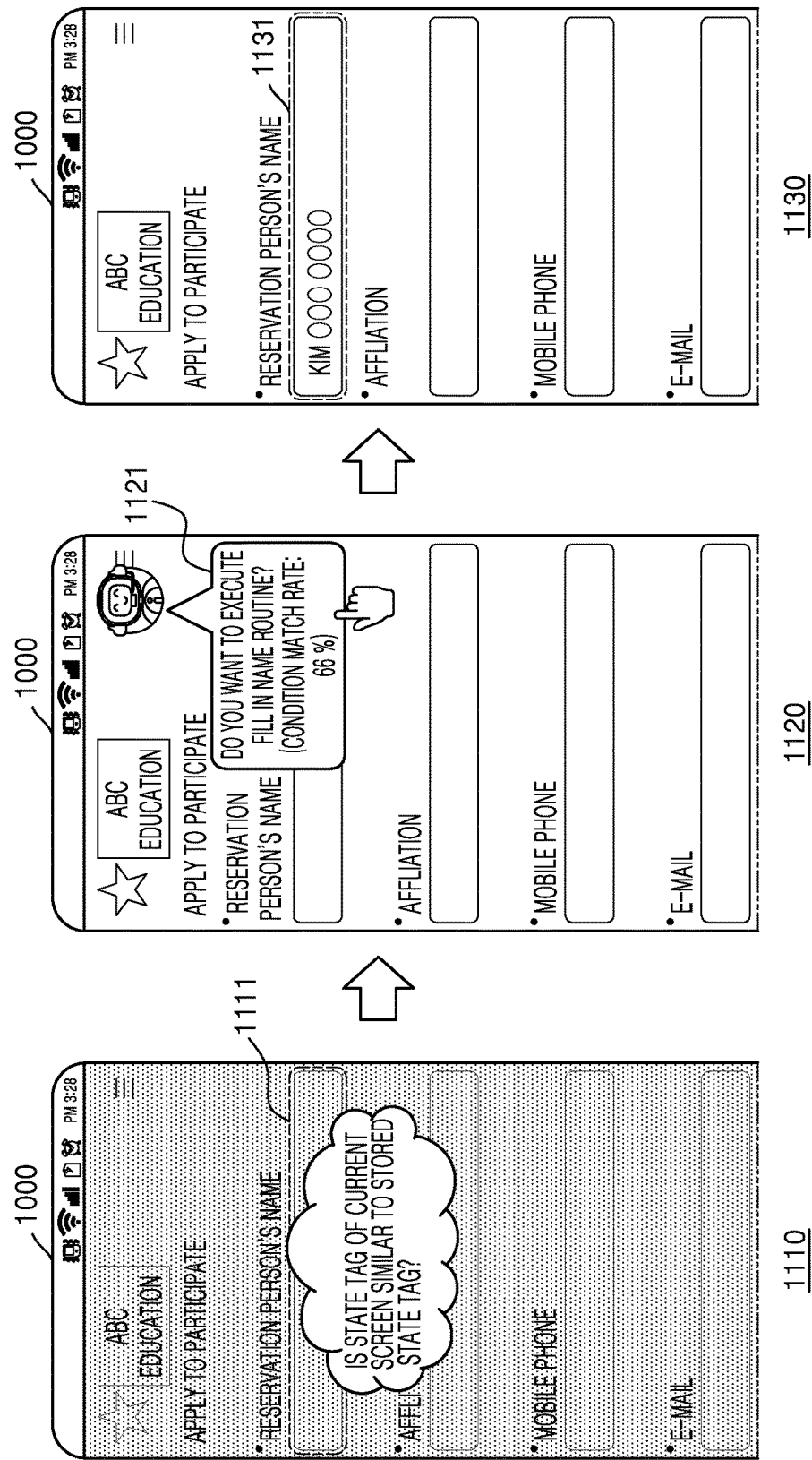
FIG. 11 is a diagram illustrating a process of executing a routine for performing name filling in an electronic device, according to another embodiment of the disclosure.

FIG. 11 is a diagram illustrating a process of executing a routine for performing name filling in the electronic device 1000, according to another embodiment of the disclosure.

Referring to a part 1110 of FIG. 11, the ABC education application may be executed in the electronic device 1000, and an input field for inputting information of a training participation application may be provided on an execution screen of the ABC education application. An input field for inputting the information of the training participation application may include a reservation person's name input field 1111 for filling a name of a person making the reservation.

As a result of identifying the execution screen of the ABC education application, the electronic device 1000 may obtain third state information indicating a state requesting information on the education participation application. The third state information may also include information indicating a state of requesting to fill in the name of a reservation person applying for participation in training. The electronic device 1000 may obtain third state tag information including state information such as a name of the person making the reservation, input name, fill in name, and the like.

The electronic device 1000 may detect a routine having state information matching the third state information from among the plurality of routines. For example, the electronic device 1000 may check information input on the execution screen of the ABC education application.

Referring to the part 1110 of FIG. 11, the information to be input may be information on the name of the person making the reservation, affiliation, mobile phone, and e-mail. The electronic device 1000 may check whether there is a routine having state information matching with state information indicating a state of inputting information in the training participation application among the plurality of routines. In addition, the electronic device 1000 may identify whether there is a routine having state information matching state information indicating a state of inputting information on the name of the person making the reservation, the affiliation, the mobile phone, and the e-mail among the plurality of routines.

For example, as a result of identifying the state information of the execution screen of the ABC education application and the state information of a plurality of routines, the electronic device 1000 may confirm that there is no routine matching with filling information for affiliation, mobile phone, and e-mail, and there is a routine matching with filling information on the name of the person making the reservation. The routine matching with the information filling of the name of the person making the reservation may include a fill in name routine of the ABC Airlines application.

In this case, because the execution screen of the ABC education application and the execution screen of the ABC Airlines application are different and the reservation person's name input field 1111 for filling in the reservation person's name, the passenger's last name input field 1011, and the passenger's first name input field 1012 are also different, a match rate between the state information of the execution screen of the ABC education application and the state information of the execution screen of the ABC Airlines application may be about 66%. For example, when the match rate is about 50% or more, an operation of inquiring whether to execute the detected routine may be set.

Referring to a part 1120 of FIG. 11, the electronic device 1000 may display a message 1121 inquiring whether to execute the fill in name routine. The electronic device 1000 may receive an input requesting execution of the fill in name routine based on the message 1121.

Referring to a part 1130 of FIG. 11, when an input is received requesting execution of the fill in name routine, the electronic device 1000 may generate a reservation person's fill in name routine for filling the reservation person's name in a reservation person's name input field 1131 based on the state information of the execution screen of the ABC education application and the fill in name routine of the ABC Airlines application.

For example, the electronic device 1000 may set an event for requesting the creation of a training participation application in the ABC education application as a condition event, and may set an event for filling in the reservation person's name in the training participation application as a result event. When an event requesting the creation of a training participation application is detected in the ABC education application, the electronic device 1000 may generate a routine in which an event for automatically writing a reservation person's name based on the condition event and the result event.

Figure 12:
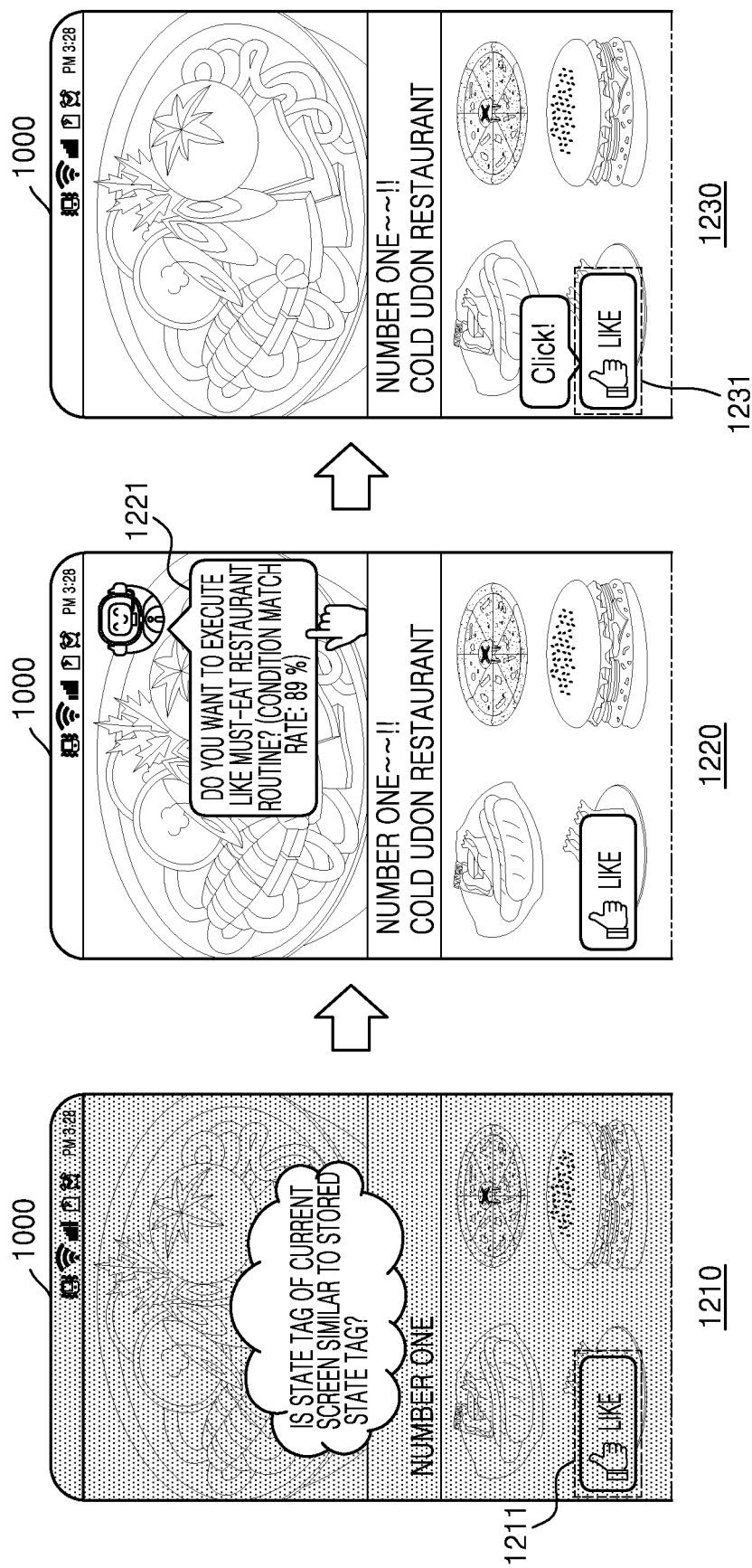
FIG. 12 is a diagram illustrating a process of executing a routine for clicking "Like must-eat restaurant" in an electronic device, according to an embodiment of the disclosure.

FIG. 12 is a diagram illustrating a process of executing a routine for clicking "like must-eat restaurant" in an electronic device 1000, according to an embodiment of the disclosure.

Referring to a part 1210 of FIG. 12, the electronic device 1000 may execute a ZZZ delivery application, and may display an image including a must-eat udon restaurant on an execution screen of the ZZZ delivery application. The execution screen of the ZZZ delivery application may include a "Like" icon 1211. For the ZZZ delivery application, a routine (hereinafter, referred to as a like must-eat restaurant routine) for clicking the "like" icon 1211 on a food that the user likes at a must-eat restaurant may be set. The like must-eat restaurant routine may include a routine for displaying information that may be recognized as a must-eat restaurant on the execution screen of the ZZZ delivery application, and clicking a "Like" icon 1211 when food pre-registered as a favorite food of the user is displayed on the execution screen of the ZZZ delivery application.

As a result of identifying the execution screen of the ZZZ delivery application, the electronic device 1000 may obtain fourth state information indicating a state in which udon, which the user likes, is displayed in the ordering menu of the must-eat restaurant. The fourth state information may include fourth state tag information including state tags such as must-eat restaurant, number one, sales number one, popular, hot menu, udon, and the like.

The electronic device 1000 may detect a like must-eat restaurant routine having state information matching the fourth state information from among the plurality of routines. For example, the electronic device 1000 may determine whether the fourth state tag information for the execution screen of the ZZZ delivery application is similar to the state tag information of the like must-eat restaurant routine.

When the fourth state tag information for the execution screen of the ZZZ delivery application is similar to the state tag information of the like must-eat restaurant routine, as shown in a part 1220 of FIG. 12, the electronic device 1000 may display a message 1221 inquiring whether to execute the like must-eat restaurant routine. For example, the message 1221 may include information indicating a match rate between the fourth state tag information and the state tag information of a like must-eat routine. For example, the match rate may be about 99%. Based on the message 1221, the electronic device 1000 may receive an input requesting execution of a like must-eat restaurant routine.

Referring to a part 1230 of FIG. 12, when an input requesting execution of the like must-eat restaurant routine is received, the electronic device 1000 may execute the like must-eat restaurant routine. The electronic device 1000 may automatically execute an operation, 1231, of clicking the "like" icon displayed on the execution screen of the ZZZ delivery application.

Figure 13:
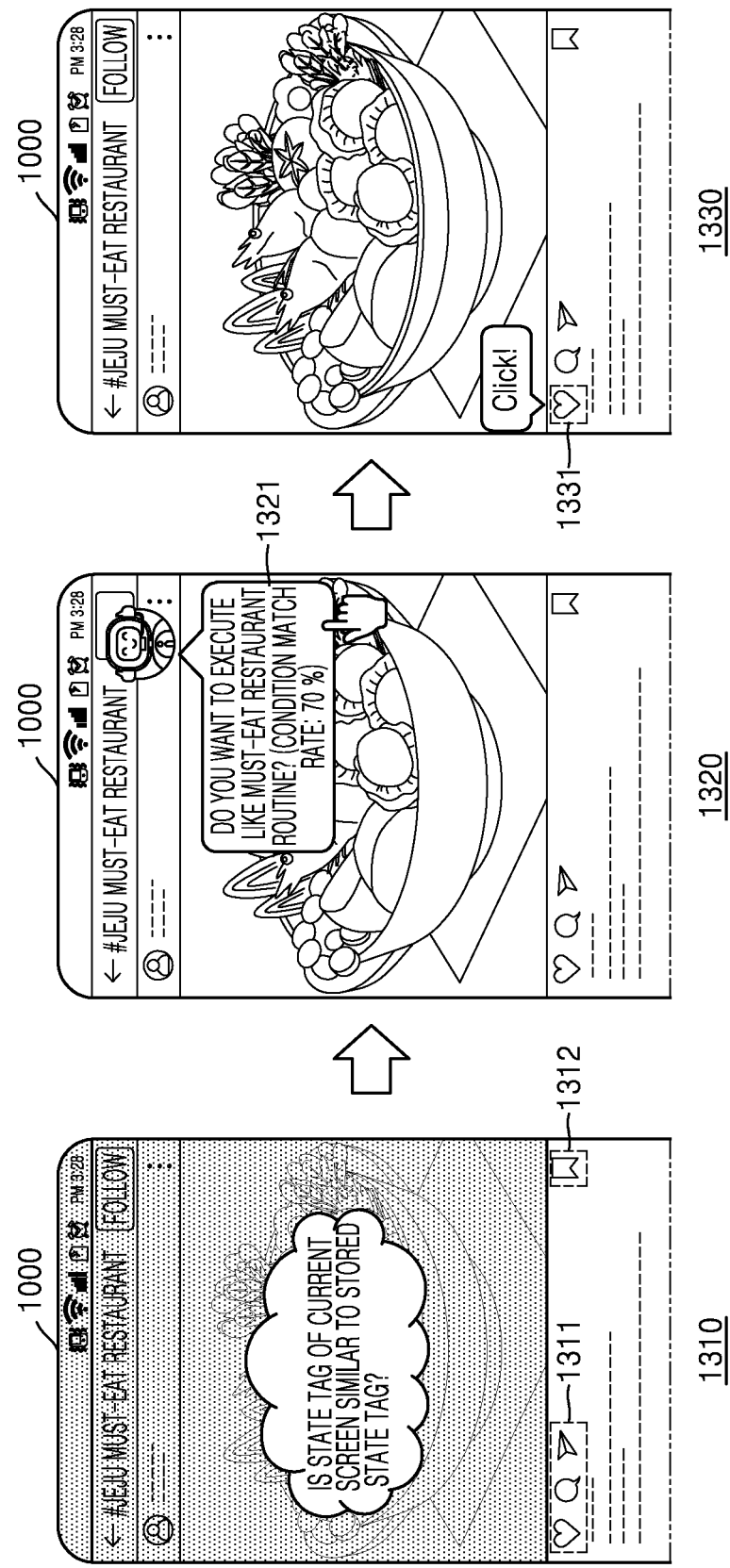
FIG. 13 is a diagram illustrating a process of executing a routine for clicking "Like must-eat restaurant" in an electronic device, according to another embodiment of the disclosure.

FIG. 13 is a diagram illustrating a process of executing a routine for clicking "like must-eat restaurant" in the electronic device 1000, according to another embodiment of the disclosure.

Referring to a part 1310 of FIG. 13, the electronic device 1000 may execute a QQQ blog application, and may display information introduced as a must-eat restaurant in Jeju on an execution screen of the QQQ blog application. The execution screen of the QQQ blog application may include icons 1311 including a "like" icon, a "write review" icon, a "share" icon, and a "bookmark" icon 1312.

As a result of identifying the execution screen of the QQQ blog application, the electronic device 1000 may obtain fifth state information indicating a state of introducing a must-eat seafood soup restaurant in Jeju Island. The fifth state information may include fifth state tag information including state tags such as Jeju Island, must-eat restaurant, seafood soup, popular, like, write review, share, bookmark, and the like. Here, the seafood soup may include food pre-registered as a favorite food of the user.

The electronic device 1000 may detect a routine having state information matching the fifth state information from among the plurality of routines. For example, the electronic device 1000 may identify whether there is a routine having state information matching state information indicating a state in which a like, review, and share may be left for a must-eat restaurant and a bookmark may be set, from among the plurality of routines.

For example, as a result of identifying the state information of the execution screen of the QQQ blog application and the state information of the plurality of routines, the electronic device 1000 may determine that there is no routine matching with a write review routine, a share routine, and bookmark setting, and there is a routine matching with clicking a like. A routine matching with clicking a "like must-eat restaurant" in the QQQ blog application may include a like must-eat restaurant routine in the ZZZ delivery application.

The QQQ blog application and the ZZZ delivery application may have different types of applications and different purposes of the service, but the QQQ blog application and the ZZZ delivery application may have in common that the QQQ blog application and the ZZZ delivery application provide a like service for users. Accordingly, a match rate between the state information of the execution screen of the QQQ blog application and the state information of the execution screen of the ZZZ delivery application may be about 70%. For example, when the match rate is about 50% or more, an operation of inquiring whether to execute the detected routine may be set.

Referring to a part 1320 of FIG. 13, the electronic device 1000 may display a message 1321 inquiring whether to execute a like must-eat restaurant routine. Based on the message 1321, the electronic device 1000 may receive an input requesting execution of a like must-eat restaurant routine.

Referring to part 1330 of FIG. 13, when an input requesting execution of the like must-eat restaurant routine is received, the electronic device 1000 may generate a like must-eat restaurant routine for clicking a "like" icon 1331 for the must-eat restaurant of the QQQ blog application based on the state information of the execution screen of the QQQ blog application and the like must-eat restaurant routine of the ZZZ delivery application.

For example, the electronic device 1000 may set an event for displaying a post about a favorite food pre-registered by the user in the QQQ blog application as a condition event, and set an event of clicking a "like" icon on the post about the favorite food as a result event. When an event where a post about a favorite food is displayed in the QQQ blog application, the electronic device 1000 may generate a routine in which an event of automatically clicking a "like" icon on the post is executed based on the condition event and the result event. The electronic device 1000 may execute the generated routine to automatically click the "like" icon on the post.

Figure 14:
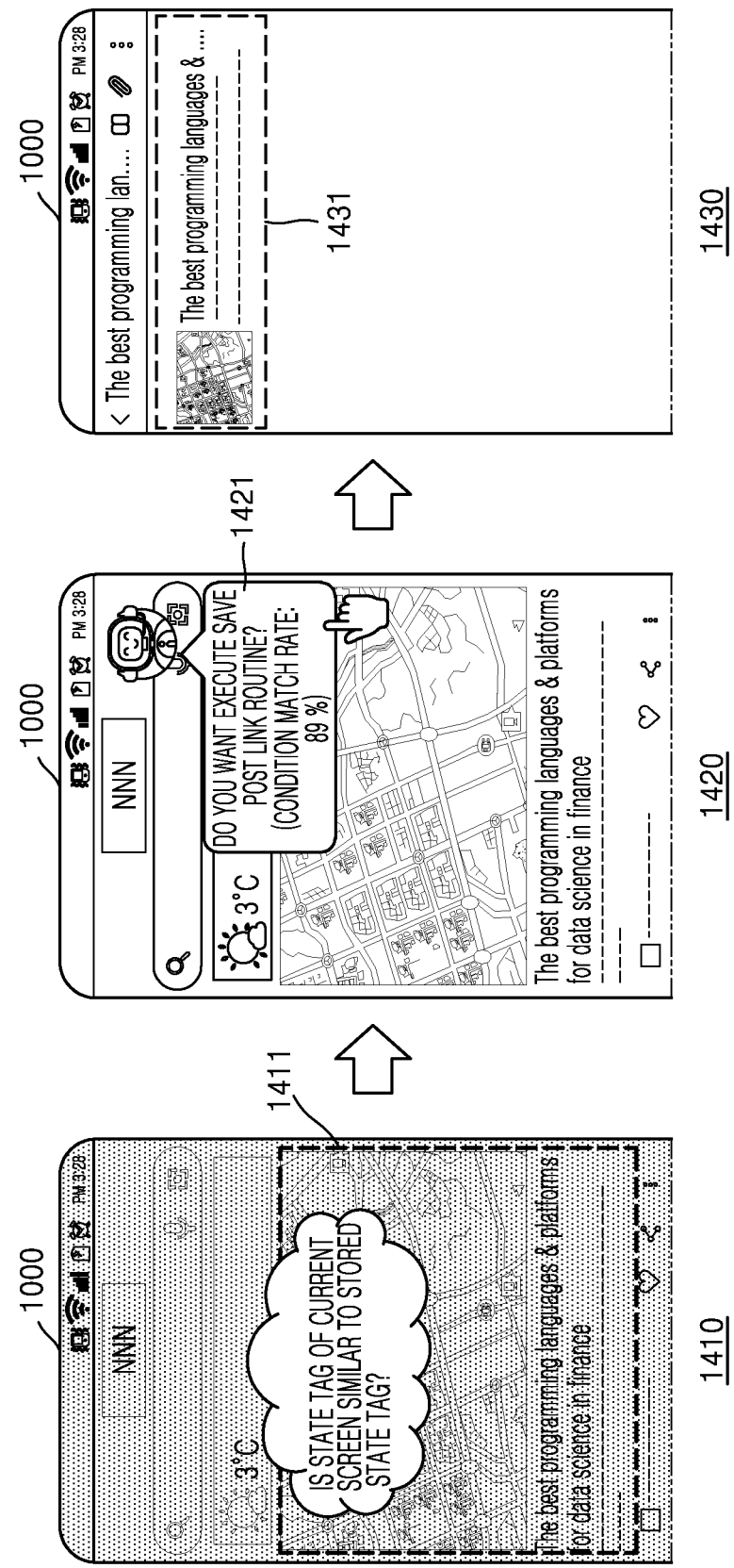
FIG. 14 is a diagram illustrating a process of executing a routine for performing link saving in an electronic device, according to an embodiment of the disclosure.

FIG. 14 is a diagram illustrating a process of executing a routine for performing link saving in the electronic device 1000, according to an embodiment of the disclosure.

Referring to a part 1410 of FIG. 14, the electronic device 1000 may execute an NNN application, and may display a post 1411 about a first material on an execution screen of the NNN application. In addition, for the NNN application, a routine (hereinafter, a save post link routine) for storing a post link for a post about the first material may be set. The save post link routine may include a routine for saving a link of a post about the first material when the post about the first material is displayed on the execution screen of the NNN application.

As a result of identifying the execution screen of the NNN application, the electronic device 1000 may obtain sixth state information indicating a state in which a post including text information and image information about the first material is displayed. The sixth state information may include sixth state tag information including a state tag related to the first material. In addition, in the NNN application, the number of times the link of the post to the first material is stored may be more than a preset number of times. The electronic device 1000 may obtain an operation of storing a link of a post for the first material in the NNN application as a usage pattern.

The electronic device 1000 may detect a save post link routine having state information matching the sixth state information from among a plurality of routines, based on the sixth state information and the usage pattern information of the NNN application. For example, the electronic device 1000 may determine whether the sixth state tag information on the execution screen of the NNN application is similar to the state tag information of the save post link routine.

When the sixth state tag information for the execution screen of the NNN application and the state tag information of the save post link routine are similar, as shown in a part 1420 of FIG. 14, the electronic device 1000 may display a message 1421 inquiring whether to execute the save post link routine. For example, the message 1421 may include information indicating a match rate between the sixth state tag information and the state tag information of the save post link routine. For example, the match rate may be about 89%. The electronic device 1000 may receive an input requesting execution of the save post link routine based on the message 1421.

Referring to a part 1430 of FIG. 14, when an input requesting execution of the save post link routine is received, the electronic device 1000 may execute the save post link routine. The electronic device 1000 may automatically execute an operation, 1431, of storing a link of a post for the first material and displaying the stored result.

Figure 15:
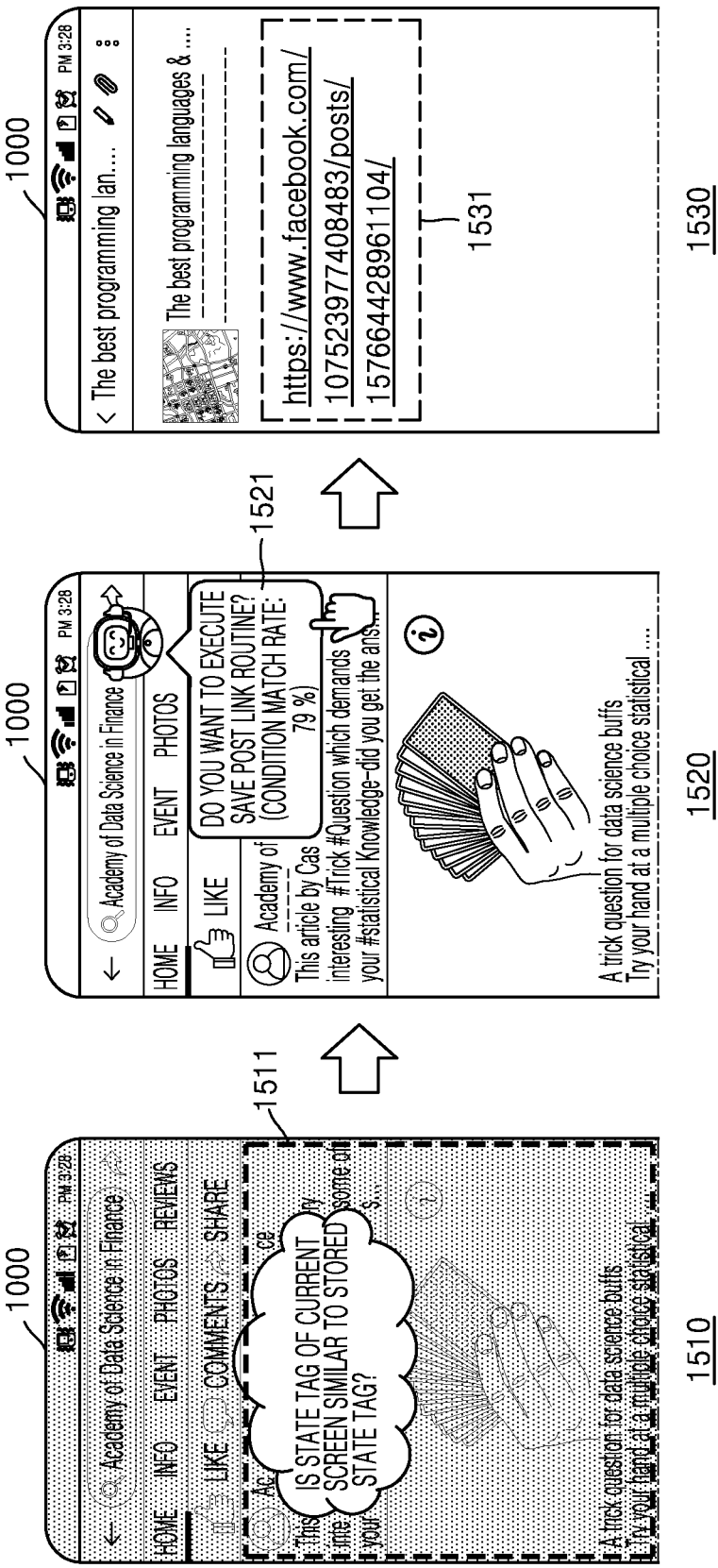
FIG. 15 is a diagram illustrating a process of executing a routine for performing link saving in an electronic device, according to another embodiment of the disclosure.

FIG. 15 is a diagram illustrating a process of executing a routine for performing link saving in the electronic device 1000, according to another embodiment of the disclosure.

Referring to a part 1510 of FIG. 15, the electronic device 1000 may execute an OOO application, and may display a post 1511 about a second material on an execution screen of the OOO application. In the OOO application, a function for saving a link to a post in a notepad application may be provided.

As a result of identifying the execution screen of the OOO application, the electronic device 1000 may obtain seventh state information indicating a state in which a post including text information and image information about the second material is displayed. The seventh state information may include seventh state tag information including a state tag related to the second material. In addition, in the OOO application, the number of times the link of the post to the second material is stored may be more than a preset number of times. The electronic device 1000 may obtain an operation of storing a link of a post for the second material as a usage pattern in the OOO application.

The electronic device 1000 may detect a save post link routine of the NNN application, having state information matching the seventh state information from among a plurality of routines based on the seventh state information and the usage pattern information of the OOO application. For example, the electronic device 1000 may determine whether the seventh state tag information on the execution screen of the OOO application is similar to the state tag information of the save post link routine of the NNN application. In addition, the electronic device 1000 may determine whether the usage pattern information of the OOO application is similar to the usage pattern information of the NNN application.

For example, when the second material and the first material are related to the same field, the electronic device 1000 may determine that the seventh state tag information on the execution screen of the OOO application and the state tag information of the save post link routine of the NNN application are similar.

Referring to a part 1520 of FIG. 15, the electronic device 1000 may display a message 1521 inquiring whether to execute the save post link routine. For example, the message 1521 may include information indicating a match rate between the seventh state tag information and the state tag information of the save post link routine of the NNN application. For example, the match rate may be about 79%. The electronic device 1000 may receive an input requesting execution of the save post link routine based on the message 1521.

Referring to a part 1530 of FIG. 15, when an input is received requesting execution of the save post link routine, the electronic device 1000 may generate a routine corresponding to the save post link routine of the NNN application based on the state information and usage pattern information of the OOO application. For example, when a post about the second material is displayed, the electronic device 1000 may generate a routine for storing a link 1531 of a post on the second material in the notepad application. The electronic device 1000 may execute the generated routine to store the link of the post on the second material in the notepad application.

Figure 16:
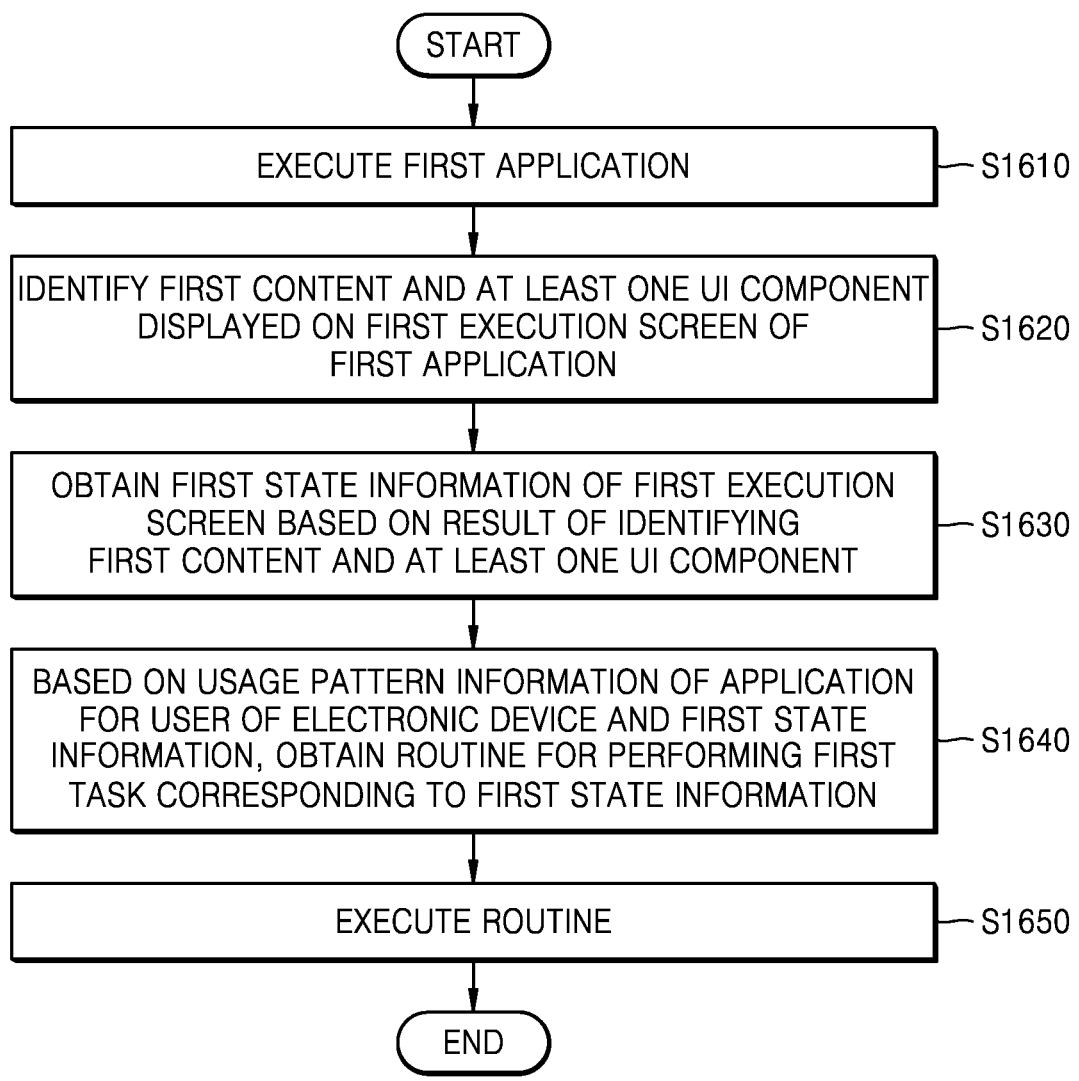
FIG. 16 is a flowchart of an operating method of an electronic device, the operating method comprising obtaining state information based on a result of identifying a content displayed on a screen of the electronic device and a UI component, and executing a routine corresponding to the state information, according to an embodiment of the disclosure.

FIG. 16 is a flowchart of an operating method of the electronic device 1000, the method comprising: obtaining state information based on a result of identifying a content and a UI component displayed on a screen of the electronic device 1000; and executing a routine corresponding to the state information, according to an embodiment of the disclosure.

Referring to FIG. 16, in operation S1610, the electronic device 1000 may execute a first application.

In operation S1620, the electronic device 1000 may identify a first content and at least one UI component displayed on a first execution screen of the first application.

In operation S1630, the electronic device 1000 may obtain first state information of the first execution screen based on a result of identifying the first content and the at least one UI component.

For example, the electronic device 1000 may obtain relationship information indicating a correlation between the first content and a first UI component in which a user input is detected, based on attributes of the first UI component among the at least one UI component in the first execution screen of the first application. The electronic device 1000 may obtain first state information of the first execution screen of the first application based on the relationship information.

In operation S1640, the electronic device 1000 may obtain a routine for performing a first task corresponding to the first state information based on usage pattern information of applications for the user of the electronic device 1000 and the first state information.

For example, the electronic device 1000 may detect a first routine that satisfies a performance condition of the first task having state information matching the first state information from among a plurality of routines preset based on the usage pattern information of applications for the user.

For example, when the detected first routine is a routine that is executed in a second application different from the first application, the electronic device 1000 may generate a second routine for performing the first task based on the first state information and the first routine.

In operation S1650, the electronic device 1000 may execute the routine.

Figure 17:
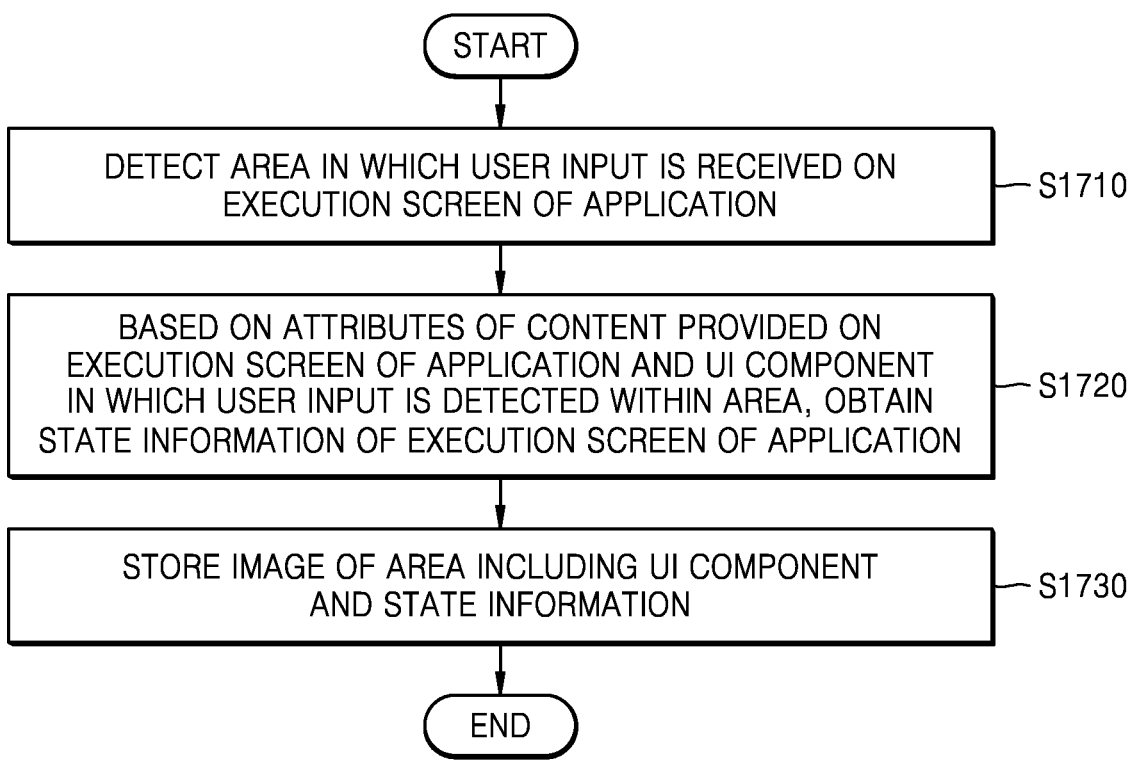
FIG. 17 is a flowchart of an operating method of an electronic device, the operating method comprising storing a UI component and state information, according to an embodiment of the disclosure.

FIG. 17 is a flowchart of an operating method of the electronic device 1000, the method comprising storing a UI component and state information, according to an embodiment of the disclosure.

The electronic device 1000 may store state information between at least one content provided in each execution screen of applications and UI components related to each execution screen of the applications.

For example, referring to FIG. 17, in operation S1710, the electronic device 1000 may detect an area in which a user input is received on an execution screen of an application.

In operation S1720, the electronic device 1000 may obtain state information of the execution screen of the application based on attributes of a content provided on the execution screen of the application and a UI component in which the user input is detected within the detected area.

In operation S1730, the electronic device 1000 may store an image of an area including the UI component and the obtained state information.

Figure 18:
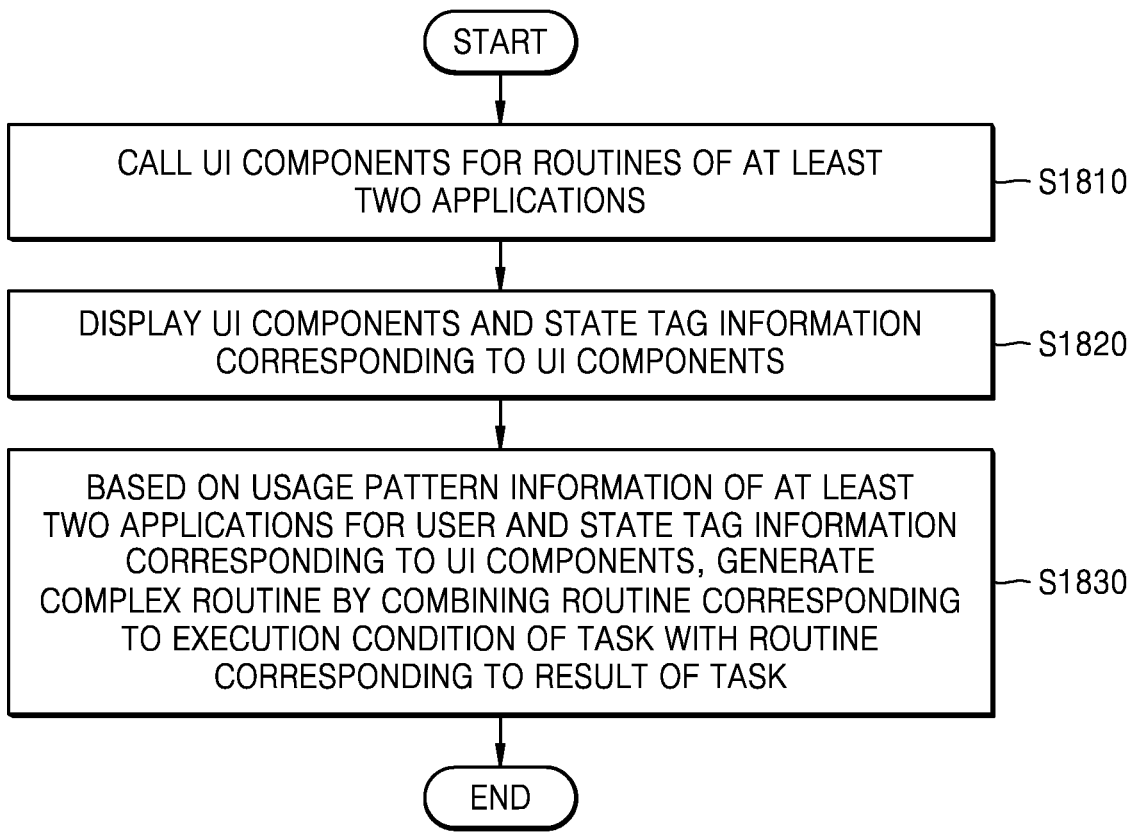
FIG. 18 is a flowchart of an operating method of an electronic device, the operating method comprising generating a complex routine by combining routines of applications, according to an embodiment of the disclosure.

FIG. 18 is a flowchart of an operating method of the electronic device 1000, the method comprising generating a complex routine by combining routines of applications, according to an embodiment of the disclosure.

For example, the electronic device 1000 may generate a complex routine by combining routines of at least two applications based on usage pattern information of the at least two applications for the user.

Referring to FIG. 18, in operation S1810, the electronic device 1000 may call UI components for the routines of the at least two or more applications.

In operation S1820, the electronic device 1000 may display the UI components and state tag information corresponding to the UI components.

In operation S1830, the electronic device 1000 may generate a complex routine by combining a routine corresponding to an execution condition of a task with a routine corresponding to a result of the task based on the usage pattern information of the at least two applications for the user and the state tag information corresponding to the UI components.

The foregoing description of the disclosure is for purposes of illustration, and those of ordinary skill in the art to which the disclosure pertains will understand that the disclosure may be easily modified into other specific forms without changing the technical spirit or essential features of the disclosure. Therefore, it should be understood that the embodiments described above are illustrative in all respects and not restrictive. For example, each component described as a single type may be implemented in a dispersed form, and likewise components described as distributed may be implemented in a combined form.

While the disclosure has been shown and described with reference to various embodiments thereof, it will be understood by those skilled in the art that that various changes in form and details may be made therein without departing from the spirit and scope of the disclosure as defined by the appended claims and their equivalents.

The invention claimed is:

1. An operating method of an electronic device, the operating method comprising:
    executing a first application in the electronic device;
    identifying a first content and at least one user interface (UI) component that are displayed on a first execution screen of the first application;
    obtaining first state information of the first execution screen based on a result of the identifying of the first content and the at least one UI component, the first state information comprising state tag information including at least one of words, keywords, phrases, or sentences;
    obtaining a routine for performing a first task corresponding to the first state information based on usage pattern information of applications for a user of the electronic device and the first state information;
    displaying a message inquiring whether to execute the routine based on the state tag information for the first application being similar to the state tag information of the routine, the message including information indicating a match rate between the first state information and state information of the routine; and
    in response to receiving an input requesting execution of the routine based on the message, executing the routine.

2. The operating method of claim 1, wherein the obtaining of the first state information comprises obtaining first state tag information indicating the first state information, based on the first content and an attribute of a first UI component in which a user input is detected from among the at least one UI component in the first execution screen of the first application.

3. The operating method of claim 1, wherein the obtaining of the routine comprises detecting a first routine from among a plurality of routines preset based on the usage pattern information of the applications for the user, the first routine having state information matching the first state information to satisfy an execution condition of the first task.

4. The operating method of claim 3, wherein the obtaining of the routine comprises, when the detected first routine is a routine to be executed in a second application different from the first application, generating a second routine for performing the first task based on the state information and the first routine.

5. The operating method of claim 1, further comprising:
    obtaining first usage pattern information of the first application for the user, based on a result of monitoring an operation of the first application; and
    generating a first routine, based on the first usage pattern information of the first application.

6. The operating method of claim 1, further comprising:
    obtaining state information of each execution screen of the applications based on a correlation between at least one content provided on each execution screen of the applications and UI components related to each execution screen of the applications; and
    storing the state information of each execution screen of the applications.

7. The operating method of claim 6, wherein the storing of the state information comprises:
    detecting an area in which an input of the user is received in an execution screen of a second application among the applications;
    obtaining second state information of the execution screen of the second application, based on a second content provided on the execution screen of the second application and an attribute of a second UI component in which the input of the user is detected in the area; and
    storing second state tag information indicating an image of the area and the obtained second state information, the area including the second UI component.

8. The operating method of claim 1, further comprising generating a complex routine by combining routines of at least two applications for the user, based on usage pattern information of the at least two applications.

9. The operating method of claim 8, wherein the generating of the complex routine by combining the routines of the at least two applications comprises:
    calling UI components for the routines of the at least two applications;
    displaying the UI components and state tag information corresponding to the UI components; and
    generating the complex routine by combining a routine corresponding to an execution screen of a task with a routine corresponding to a result of the task, based on the usage pattern information of the at least two applications for the user and the state tag information corresponding to the UI components.

10. The operating method of claim 1, wherein the executing the routine comprises:
    recommending execution of the routine; and
    when an input for approving the recommending of the routine is received, performing the first task.

11. The operating method of claim 1, further comprising receiving, from a server, a routine of the first application having state information matching with state information satisfying an execution condition of a routine of an application installed in the electronic device.

12. The operating method of claim 1, further comprising:
    learning at least one state information used for generating at least one routine of the applications and an image corresponding to the at least one state information; and
    based on a result of the learning, updating a learning model for recommending a routine according to state information obtained from an application.

13. An electronic device comprising:
    a communication interface configured to communicate with an external device;
    a user input device;
    a display;
    a processor configured to control an operation of the electronic device; and
    a memory storing at least one instruction,
    wherein the processor is further configured to execute the at least one instruction to:
        execute a first application in the electronic device,
        identify a first content and at least one user interface (UI) component that are displayed on a first execution screen of the first application,
        obtain first state information of the first execution screen based on a result of the identifying of the first content and the at least one UI component, the first state information comprising state tag information including at least one of words, keywords, phrases, or sentences,
        obtain a routine for performing a first task corresponding to the first state information based on usage pattern information of applications for a user of the electronic device and the first state information, display a message inquiring whether to execute the routine based on the state tag information for the first application being similar to the state tag information of the routine, the message including information indicating a match rate between the first state information and state information of the routine, and in response to receiving an input requesting execution of the routine based on the message, execute the routine.

14. The electronic device of claim 13, wherein the processor is further configured to execute the at least one instruction to obtain first state tag information indicating the first state information, based on the first content and an attribute of a first UI component in which a user input is detected from among the at least one UI component in the first execution screen of the first application.

15. The electronic device of claim 13, wherein the processor is further configured to execute the at least one instruction to detect a first routine from among a plurality of routines preset based on the usage pattern information of the applications for the user, the first routine having state information matching the first state information to satisfy an execution condition of the first task.

16. The electronic device of claim 15, wherein the processor is further configured to execute the at least one instruction to, when the detected first routine is a routine to be executed in a second application different from the first application, generate a second routine for executing the first task based on the state information and the first routine.

17. The electronic device of claim 13, wherein the processor is further configured to execute the at least one instruction to:

obtain state information of each execution screen of the applications based on a correlation between at least one content provided on each execution screen of the applications and UI components related to each execution screen of the applications, and store the state information of each execution screen of the applications in the memory.

18. The electronic device of claim 17, wherein the processor is further configured to execute the at least one instruction to:

detect an area in which an input of the user is received in an execution screen of a second application among the applications, obtain second state information of the execution screen of the second application, based on a second content provided on the execution screen of the second application and an attribute of a second UI component in which the input of the user is detected in the area, and store second state tag information indicating an image of the area and the obtained second state information, the area including the second UI component.

19. The electronic device of claim 13, wherein the processor is further configured to execute the at least one instruction to generate a complex routine by combining routines of at least two applications for the user, based on usage pattern information of the at least two applications.

20. A non-transitory computer-readable recording medium having recorded thereon at least one instruction, which when executed by a processor of an electronic device, causes the processor to:

execute a first application in the electronic device;

identify a first content and at least one user interface (UI) component that are displayed on a first execution screen of the first application;

obtain first state information of the first execution screen based on a result of the identifying of the first content and the at least one UI component, the first state information comprising state tag information including at least one of words, keywords, phrases, or sentences;

obtain a routine for performing a first task corresponding to the first state information based on usage pattern information of applications for a user of the electronic device and the first state information;

display a message inquiring whether to execute the routine based on the state tag information for the first application being similar to the state tag information of the routine, the message including information indicating a match rate between the first state information and state information of the routine; and in response to receiving an input requesting execution of the routine based on the message, execute the routine.

* * * * *